United States Patent
Wang et al.

(10) Patent No.: US 11,298,830 B2
(45) Date of Patent: Apr. 12, 2022

(54) ROPE TRACTION TYPE GRINDING, CLEANING, AND COATING INTEGRATED OPERATION ROBOT

(71) Applicant: Hefei University of Technology, Anhui (CN)

(72) Inventors: Daoming Wang, Anhui (CN); Pengtao Xie, Anhui (CN); Bin Zi, Anhui (CN); Zhengyu Wang, Anhui (CN); Sen Qian, Anhui (CN); Zitong Huang, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 0 days.

(21) Appl. No.: 17/143,841

(22) Filed: Jan. 7, 2021

(65) Prior Publication Data

US 2021/0387351 A1    Dec. 16, 2021

(30) Foreign Application Priority Data

Jun. 16, 2020 (CN) .......................... 202010548323.X

(51) Int. Cl.
*B25J 11/00* (2006.01)
*B05B 13/04* (2006.01)
(Continued)

(52) U.S. Cl.
CPC ....... *B25J 11/0075* (2013.01); *B05B 13/0431* (2013.01); *B08B 3/024* (2013.01);
(Continued)

(58) Field of Classification Search
CPC ... B25J 11/0065; B25J 11/0075; B25J 11/005; B25J 9/104; B25J 9/0018; B25J 5/00;
(Continued)

(56) References Cited

U.S. PATENT DOCUMENTS 2,729,918 A * 1/1956 Van Denburgh ........ B24C 3/062
451/92
3,497,902 A * 3/1970 Hartigan ............... E04G 23/002
15/302

(Continued)

FOREIGN PATENT DOCUMENTS

| CN | 110315511 A | 10/2019 |
|----|-------------|---------|
| CN | 110485685 A | 11/2019 |
| CN | 110778077 A | 2/2020 |

OTHER PUBLICATIONS

First official action for corresponding Chinese application No. 202010548323, dated Mar. 26, 2021.

*Primary Examiner* — Tyrone V Hall, Jr.
*Assistant Examiner* — Makena S Markman
(74) *Attorney, Agent, or Firm* — Notaro, Michalos & Zaccaria P.C.

(57) ABSTRACT

The present disclosure relates to a rope traction type grinding, cleaning, and coating integrated operation robot. The operation robot includes a hanging basket, a first traction mechanism connected to the hanging basket, a grinding mechanism arranged in front of the hanging basket, and a cleaning and spraying mechanism and a spring reaction force regulation mechanism arranged in the hanging basket. The first traction mechanism includes first ropes for connecting the hanging basket and first rope winding mechanisms. The cleaning and spraying mechanism includes a first vertical plate and a second vertical plate that are arranged in parallel in a vertical direction. A cleaning nozzle and a spraying nozzle are mounted on the first vertical plate. From the above technical solution, it can be seen that the operation robot adopts a rope traction manner, and has the advantages of large work space, low mechanism inertia, and accurate and reliable location.

11 Claims, 16 Drawing Sheets

(51) Int. Cl.
*B08B 3/02* (2006.01)
*B08B 13/00* (2006.01)
*B24B 7/18* (2006.01)
*B24B 41/02* (2006.01)
*B25J 5/00* (2006.01)
*B25J 9/10* (2006.01)
*B08B 3/08* (2006.01)

(52) U.S. Cl.
CPC .............. *B08B 3/08* (2013.01); *B08B 13/00* (2013.01); *B24B 7/182* (2013.01); *B24B 41/02* (2013.01); *B25J 5/00* (2013.01); *B25J 9/104* (2013.01); *B25J 11/0065* (2013.01)

(58) Field of Classification Search
CPC ... B63B 59/06; B63B 59/10; B63B 2059/065; E04G 23/002; E04G 3/325; E04G 3/28; E04G 3/30; E04G 3/305; E04G 3/32; B08B 3/024; B08B 3/04; B08B 3/08; B08B 1/001; B08B 1/002; B08B 1/04; B05B 13/0431; B05B 13/0278; B24B 27/0015; B24B 27/0038; B24B 27/0076; B24B 27/033; B24B 27/04; B24C 3/06; B24C 3/062; B24C 3/04
See application file for complete search history.

(56) References Cited

U.S. PATENT DOCUMENTS

| | | | |
|---|---|---|---|
| 5,398,632 A * | 3/1995 | Goldbach | B63C 5/02 114/222 |
| 5,730,646 A * | 3/1998 | Watkin | B24C 3/062 451/2 |
| 2018/0036865 A1* | 2/2018 | Bryntesen | B24C 7/0038 |
| 2021/0155344 A1* | 5/2021 | Mura Yanez | G06N 3/00 |
| 2021/0171552 A1* | 6/2021 | Mehellou | A61P 35/00 |

* cited by examiner

ROPE TRACTION TYPE GRINDING, CLEANING, AND COATING INTEGRATED OPERATION ROBOT

TECHNICAL FIELD

The present disclosure relates to the field of robots, and in particular, to a rope traction type grinding, cleaning, and coating integrated operation robot.

BACKGROUND

In manufacturing and cleaning of large equipment, grinding, cleaning and spraying of an outer surface are necessary working processes. When a manual manner is used for operation, there are the disadvantages of high labor intensity, low work efficiency, high danger coefficient and the like. In addition, a paint will do great harm to workers' health in a spraying process, meanwhile, the spraying quality is difficult to ensure. When a traditional spraying robot is used for operation, there are the disadvantages of small work space, low mechanical efficiency, low tail-end operation accuracy and the like, and is bulky in the operation of the large equipment. In addition, at present, most of the large-scale equipment grinding, cleaning and spraying still use different machines for separate operation, which is complex in operation and low in efficiency.

The Chinese patent document number "CN110027673A" proposes an adaptive traction wall climbing robot for multi-functional machining of a giant ship hull. This robot needs to change working heads with different functions when facing different machining requirements, which reduces the machining efficiency. Meanwhile, an electromagnetic adsorption type is used, and the electromagnetic adsorption needs electric energy to maintain adsorption capacity, so the working capacity is limited.

The Chinese patent document number "CN108942897A" proposes a rope traction parallel spraying robot for an outer surface of a ship hull. A steel wire rope is used as a transmission element for transferring the motion and force of a driver to a spray gun, the spraying of large area wall surfaces on both sides of the ship hull is realized by controlling the movement of the spray gun in a spraying surface. This spraying robot has limited transverse displacement, and the nozzle is low in flexibility, so the spraying robot is not suitable for spraying the parts with great changes of lateral displacement and surface shape.

The Chinese patent document number "CN108970866A" proposes a sectional automatic coating system for a large ship. Large-space, flexible, and multi-plane automatic spraying is realized by a rope driven automatic robot coating system. This robot uses parallel ropes to ensure that the spraying robot is kept horizontal all the time in a working process, but the reaction force generated in a spraying process cannot be avoided, and the spraying quality cannot be guaranteed.

In conclusion, in large-scale spraying, most equipment has a plurality of limitations in replacing working heads and balancing the reaction force of the equipment in the spraying process, which results in low efficiency and low quality.

SUMMARY

The objective of the present disclosure is to provide a rope traction type grinding, cleaning, and coating integrated operation robot. The robot realizes a grinding, cleaning, and coating integrated operation in a rope traction manner, and can effectively resist vibration in an operation process and automatically regulate the reaction force generated in the operation process, which improves the operation quality, efficiency and stability.

To achieve the above objective, the present disclosure adopts the following solution: the rope traction type grinding, cleaning, and coating integrated operation robot includes a hanging basket, a first traction mechanism connected to the hanging basket, a grinding mechanism arranged in front of the hanging basket, and a cleaning and spraying mechanism and a spring reaction force regulation mechanism arranged in the hanging basket. The first traction mechanism includes a first rope for connecting the hanging basket and a first rope winding mechanism. The winding and unwinding of the first rope are used for regulating the movement of the hanging basket of three degrees of freedom in space. The cleaning and spraying mechanism includes a first vertical plate and a second vertical plate that are arranged in parallel in a vertical direction. A cleaning nozzle and a spraying nozzle are mounted on the first vertical plate. The spring reaction force regulation mechanism includes a third vertical plate that is parallel to the second vertical plate; the second vertical plate is located between the first vertical plate and the third vertical plate, and may move in the front-back direction of the hanging basket. The third vertical plate is fixedly connected to the hanging basket. A telescopic rod and a second traction mechanism for connecting the first vertical plate and the second vertical plate are arranged therebetween. The stretching and contracting of the telescopic rod make the first vertical plate move back and forth relative to the hanging basket. The second traction mechanism controls the first vertical plate to realize the adjustment of a pitch angle. A rigid rod for connecting the third vertical plate and the second vertical plate and a third traction mechanism are arranged therebetween; one end of the rigid rod is fixedly connected to the second vertical plate; the other end of the rigid rod is connected to springs arranged on the third vertical plate after penetrating through the third vertical plate vertically. The thrust and reaction force stressed on the cleaning and spraying mechanism may be balanced by the change of lengths of the springs and the change of an included angle between each of the springs and the rigid rod. The grinding mechanism includes a grinding head and a telescopic mechanism for connecting the grinding head and the hanging basket.

One end of the first rope is connected to the first rope winding mechanism fixed to the ground, and the other end of the first rope is connected to a single-ended magnetorheological damper arranged at the top of the hanging basket after surrounding through a first pulley block fixed to the top surface of a wall. The other end of the single-ended magnetorheological damper is connected to the top end of the hanging basket through a pin shaft; the first rope winding mechanism is driven to rotate by a first driving motor to realize the winding and unwinding of the first rope. Four groups of the first ropes, the first rope winding mechanisms, the first driving motors, the first pulley blocks, and the single-ended magnetorheological dampers are respectively arranged; the four groups of the single-ended magnetorheological dampers are respectively located at four corners of the top of the hanging basket.

The first rope winding mechanism includes a drum used for winding the first rope, and a left end cover and a right end cover arranged on the two sides of the drum. A first boss and a second boss are respectively arranged in the centers of the end surfaces, close to each other, of the left end cover and a right end cover. The first boss and the second boss are respectively in rotating fit with the left end cover and the right end cover. A roller shaft which is fixedly connected to the first boss and the second boss is arranged in the centers thereof. The drum is arranged on the roller shaft in a sleeving manner, and the drum is in threaded connection with the roller shaft; rotating shafts which penetrate through the drum are uniformly distributed in the circumferential direction of the roller shaft. Two ends of the rotating shaft are respectively fixedly connected to the left end cover and the right end cover. A threaded section matched with the drum is arranged on the roller shaft. A threaded hole matched with the threaded section is formed in the drum. The rotating shaft is a polished shaft. A polished hole which is in transition fit with the rotating shaft is formed in the drum.

The telescopic mechanism includes a first fixed table and a second fixed table that are arranged in parallel in the vertical direction. A lifting scissors mechanism for connecting the first fixed table and the second fixed table is arranged therebetween. The lifting scissors mechanism is driven by a hydraulic cylinder. The grinding head is connected to the outer side surface of the first fixed table through a spherical hinge. The second fixed table is matched and fixed to horizontal sliding rails arranged on a mounting plate of the hanging basket. The second fixed table may move left and right in the direction limited by the horizontal sliding rails.

The telescopic rod is connected at the centers of the first vertical plate and the second vertical plate. One end of the telescopic rod is connected to a connecting pin arranged on the first vertical plate through a candan universal joint, and the other end of the telescopic rod is fixedly connected to the second vertical plate. The second traction mechanism includes second ropes, second pulley blocks fixed to the first vertical plate, and second rope winding mechanisms and third rope winding mechanisms fixed to the second vertical plate. One end of the second rope is connected to the second rope winding mechanism, and the other end of the second rope is connected to the third rope winding mechanism after surrounding through the second pulley block. The second rope winding mechanism and the third rope winding mechanism are driven by a second driving mechanism. The second rope winding mechanism, the third rope winding mechanism, and the second driving mechanism are all fixed to an upper steller hinge. A lower steller hinge matched with the upper steller hinge is fixed to the second vertical plate. A first candan universal joint for connecting the upper steller hinge and the lower steller hinge is arranged therebetween. Three groups of the second ropes, the second pulley blocks, the second rope winding mechanisms, the third rope winding mechanisms, and the second driving motors are respectively arranged.

Both the cleaning nozzle and the spraying nozzle are fixed to an S-shaped nozzle gripper; a rotary shaft in rotating fit with the outer plate surface of the first vertical plate is arranged in the center of the S-shaped nozzle gripper; under the driving of a motor, the rotary shaft completes a rotation of 0 to 180 degrees to switch the cleaning nozzle and the spraying nozzle; the cleaning nozzle and the spraying nozzle should be located at the central position of the second vertical plate when in a working state; the cleaning nozzle and the spraying nozzle are respectively connected to a cleaning liquid barrel and a paint barrel arranged at a bottom plate of the hanging basket through connecting pipes.

A rigid rod hole matched with the rigid rod is formed in the center of the third vertical plate. The rigid rod is connected to the rigid rod hole through a prismatic joint, and the rigid rod may move in the axial direction of a third platform; four through grooves which are perpendicular to the rigid rod are uniformly distributed in the circumferential direction of the rigid hole; a central shaft is arranged in the center of the through groove in the length direction of the through groove; a mass block is arranged on the central shaft in a sleeving manner; the mass block is in sliding fit with moving guide rails arranged on the groove walls on the two sides of the through groove; an extension spring is arranged at one end, far away from the rigid rod hole, of the central shaft in a sleeving manner; one end of the extension spring is fixed to the mass block; the other end of the extension spring is fixed to the groove wall of the through groove; the end surface, close to the second vertical plate, of the mass block is connected to the third traction mechanism; the end surface, far away from the second vertical plate, of the mass block is connected to the spring through a spring fixing terminal; the other end of the spring is connected to an end part of the rigid rod through a spring knot.

The third traction mechanism includes third ropes, and third pulley blocks and fourth rope winding mechanisms fixed to the second vertical plate; one end of the third rope is connected to the mass block; the other end of the third rope is connected to the fourth rope winding mechanism after surrounding through the third pulley block; the fourth rope winding mechanisms is driven by a third driving motor; four groups of the third ropes, the third pulley groups, the fourth rope winding mechanisms, and the third driving motors are respectively arranged.

The hanging basket is of an overall structure, and includes a top plate and a bottom plate that are arranged in parallel, and vertical posts for connecting the top plate and the bottom plate; a partition plate which is arranged horizontally is arranged between the top plate and the bottom plate; a mounting plate which is perpendicular to the partition plate and is fixed to the vertical posts at the front end of the hanging basket is arranged at the front end of the partition plate; the cleaning and spraying mechanism and the spring reaction force regulation mechanism are mounted between the top plate and the partition plate; the grinding mechanism is fixed to the outer plate surface of the mounting plate; guide rails are respectively and symmetrically arranged on the lower plate surface of the top plate and the upper plate surface of the partition plate; the arrangement direction of the guide rails coincides with the front-back direction of the hanging basket; a baffle plate is arranged at the front ends of the guide rails; the third vertical plate is arranged at the rear ends of the guide rails; the rollers in rolling fit with the guide rails are respectively arranged on the upper end surface and the lower end surface of the second vertical plate; the upper end surface and the lower end surface of the third vertical plate are respectively and fixedly connected to the top plate and the partition plate.

Magnetorheological dampers for connecting the hanging basket and the top surface of the wall are further arranged therebetween; three magnetorheological dampers are arranged; double-ended magnetorheological dampers for connecting the bottom surface of the partition plate and the vertical posts are arranged therebetween; four groups of the double-ended magnetorheological dampers are arranged; one end of the double-ended magnetorheological damper is hinged to an upper connecting pin seat arranged on the partition plate; the other end of the double-ended magnetorheological damper is hinged to a lower connecting pin seat arranged on the vertical post.

From the above technical solution, it can be seen that the operation robot adopts a rope traction manner, and has the advantages of large work space, low mechanism inertia, and accurate and reliable location. Meanwhile, the operation robot integrates grinding, cleaning and spraying mechanisms, effectively balances thrust and reaction force during a working process through the spring reaction force regulation mechanism, and is suitable for spraying manufacturing of large equipment, parts, and irregular curved surfaces thereof.

NUMERALS IN THE ABOVE DRAWINGS

Figure 1:
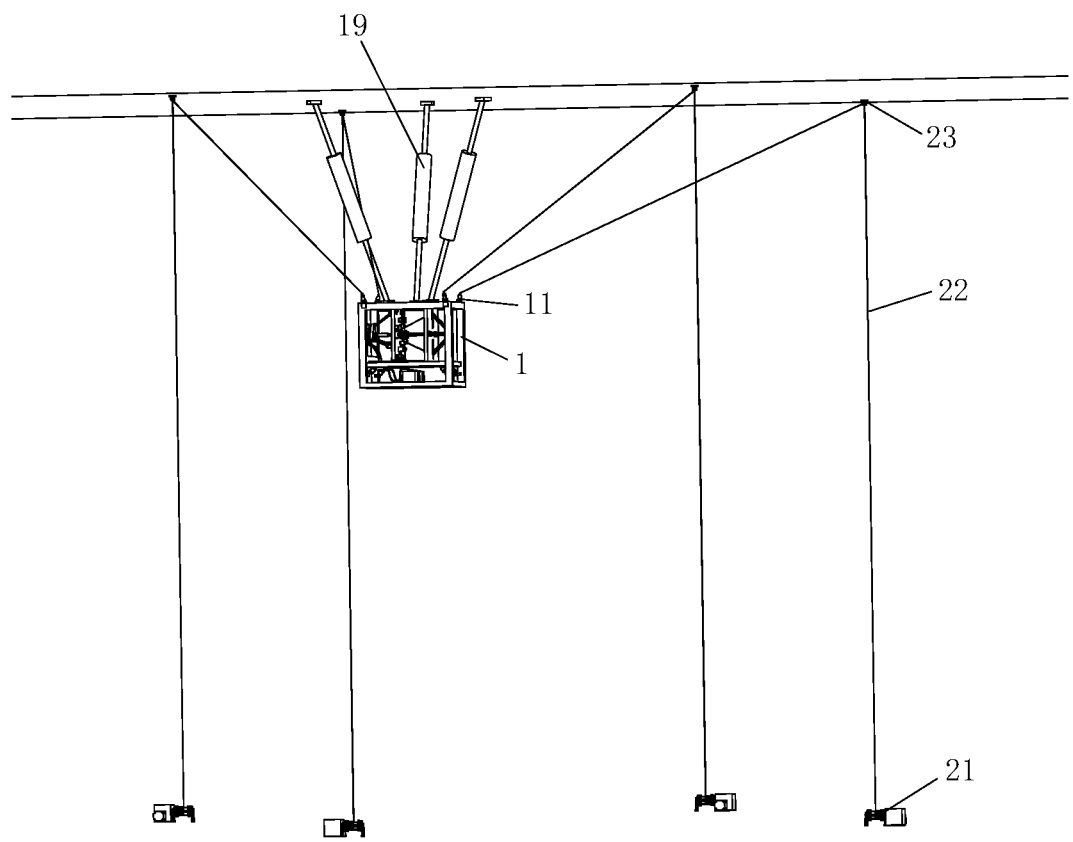
FIG. 1 is a schematic structural diagram of the present disclosure.
Figure 2:
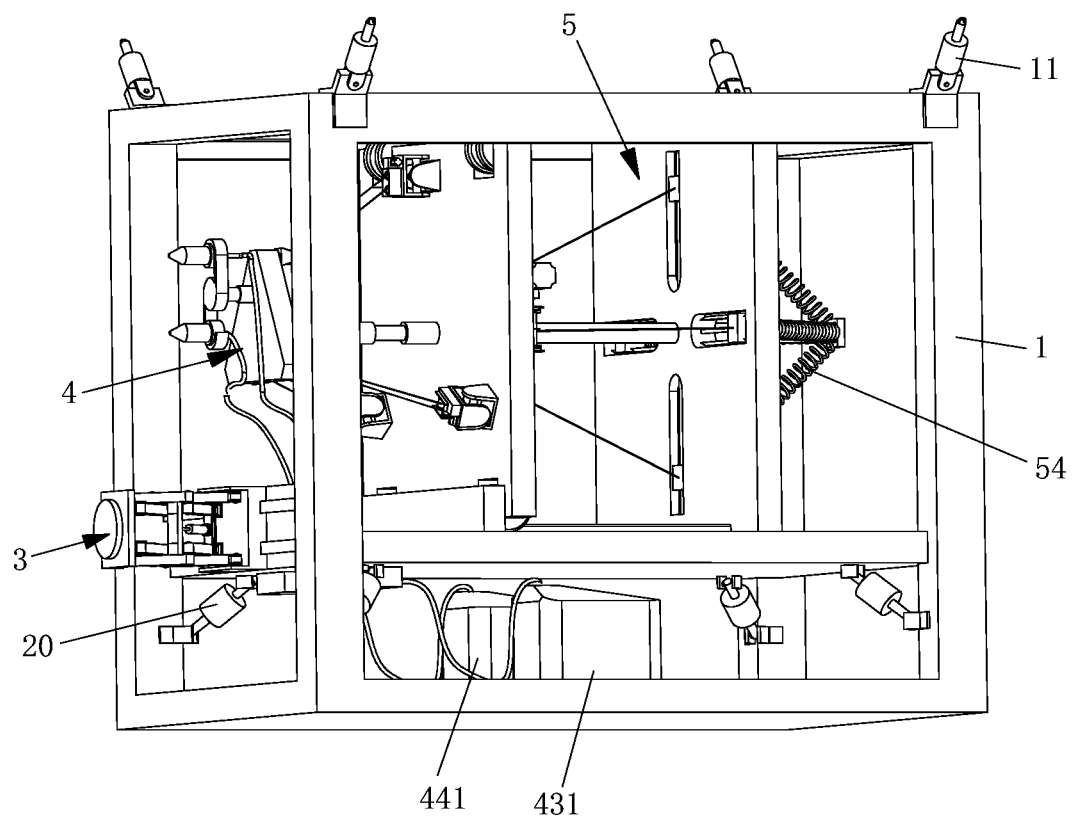
FIG. 2 is a first schematic diagram of a hanging basket, a grinding mechanism, a cleaning and spraying mechanism, and a spring reaction force regulation mechanism of the present disclosure.
Figure 3:
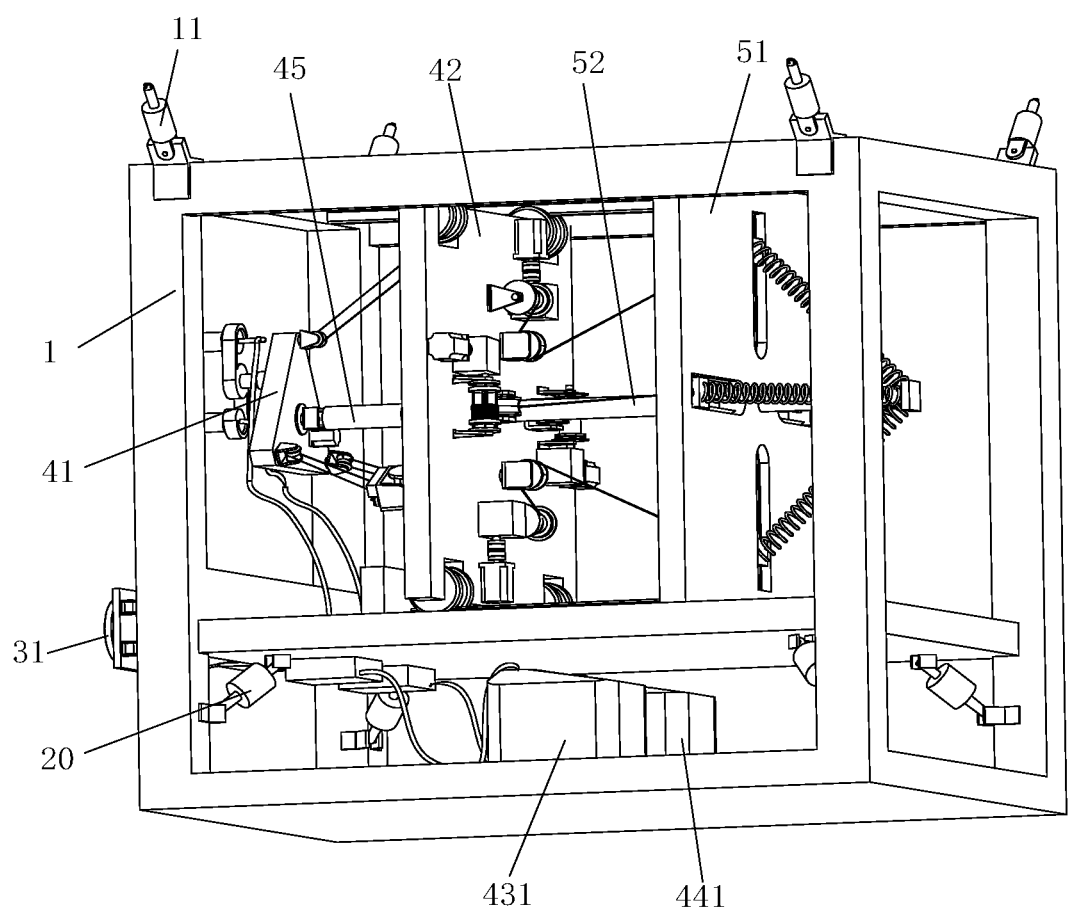
FIG. 3 is a second schematic diagram of the hanging basket, the grinding mechanism, the cleaning and spraying mechanism, and the spring reaction force regulation mechanism of the present disclosure.
Figure 4:
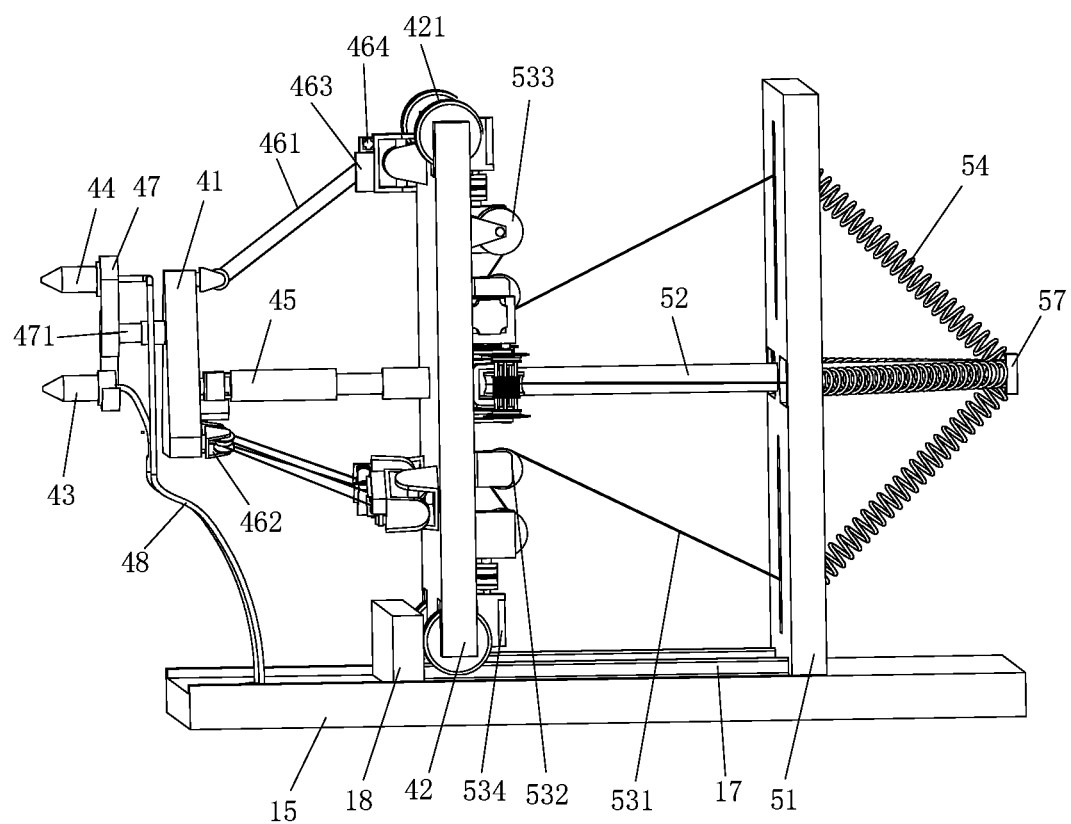
FIG. 4 is a schematic structural diagram between the cleaning and spraying mechanism and a partition plate of the hanging basket and between the spring reaction force regulation mechanism and the partition plate of the hanging basket of the present disclosure.

1-hanging basket; 11-single-ended magnetorheological damper; 12-top plate; 13-bottom plate; 14-vertical post; 15-partition plate; 16-mounting plate; 161-horizontal sliding rail; 17-guide rail; 18-baffle plate; 19-magnetorheological damper; 191-steller hinge; 192-connecting pin head; 193-piston rod; 20-double-ended magnetorheological damper; 201-upper connecting pin seat; 202-lower connecting pin seat; 2-machined object; 21-first rope winding mechanism; 211-drum; 212-left end cover; 213-right end cover; 214-roller shaft; 215-rotating shaft; 22-first rope; 23-first pulley block; 24-first driving motor; 3-grinding mechanism; 31-grinding head; 32-first fixed table; 33-second fixed table; 34-lifting scissors mechanism; 35-hydraulic cylinder; 36-spherical hinge; 4-cleaning and spraying mechanism; 41-first vertical plate; 411-connecting pin; 412-candan universal joint; 42-second vertical plate; 421-roller; 43-cleaning nozzle; 431-cleaning liquid barrel; 44-spraying nozzle; 441-paint barrel; 45-telescopic rod; 461-second rope; 462-second pulley block; 463-second rope winding mechanism; 464-third rope winding mechanism; 465-second driving motor; 466-upper steller hinge; 467-lower steller hinge; 468-first candan universal joint; 47-nozzle gripper; 471-rotary shaft; 48-connecting pipe; 5-spring reaction force regulation mechanism; 51-third vertical plate; 52-rigid rod; 531-third rope; 532-third pulley block; 533-fourth rope winding mechanism; 534-third driving motor; 54-spring; 55-rigid rod hole; 56-through groove; 561-central shaft; 562-mass block; 563-moving guide rail; 564-tension spring; 57-spring knot.

DETAILED DESCRIPTION

The present disclosure will be further described below with reference to the accompanying drawings:

a rope traction type grinding, cleaning, and coating integrated operation robot as shown in FIG. 1, FIG. 2, FIG. 3, FIG. 4, and FIG. 20 includes a hanging basket 1 of a frame structure, a first traction mechanism connected to the hanging basket 1, a grinding mechanism 3 arranged in front of the hanging basket 1, and a cleaning and spraying mechanism 4 and a spring reaction force regulation mechanism 5 arranged in the hanging basket 1. Where, four first ropes 22 of the first traction mechanism pull the periphery of the hanging basket 1 through four groups of first pulley blocks 23 fixed to the top of a wall, and controls the movement of the hanging basket 1 of three degrees of freedom in space. The grinding mechanism 3, the cleaning and spraying mechanism 4, and the spring reaction force regulation mechanism 5 are all mounted on the hanging basket 1, move synchronously along with the hanging basket 1, and may also move relative to the hanging basket 1. The first traction mechanism has the main function of performing pulling control on the hanging basket 1 to realize quick movement and accurate location in a wide range. The hanging basket 1 has the main function of bearing the grinding mechanism 3, the cleaning and spraying mechanism 4, the spring reaction force regulation mechanism 5, and some parts. The cleaning and spraying mechanism 4 has the main function of performing accurate operation on a machined object 2 to realize the switching of cleaning and spraying. The spring reaction force regulation mechanism 5 has the main function of balancing the reaction force generated in spraying and cleaning processes of the cleaning and spraying mechanism 4, so as to ensure the machining quality. The grinding mechanism 3 has the main function of performing adaptive grinding on the machined object 2.

Figure 5:
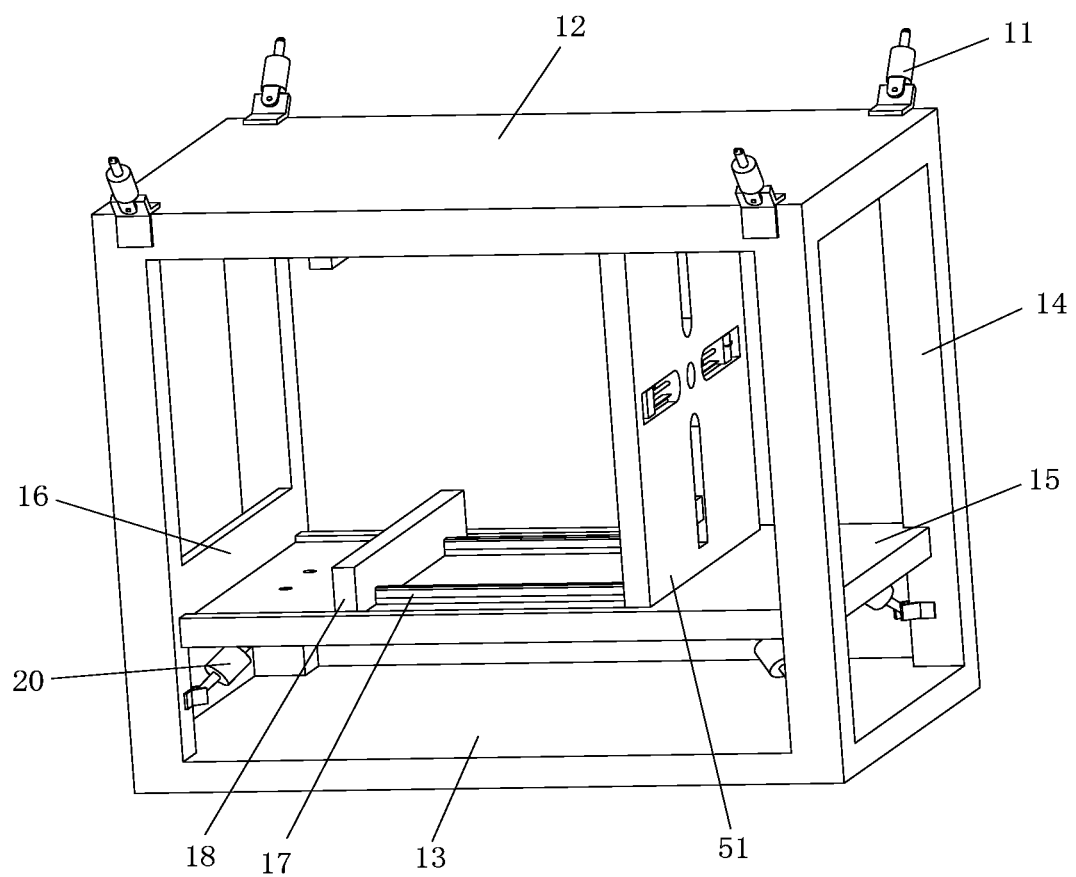
FIG. 5 is a first schematic structural diagram of the hanging basket of the present disclosure.
Figure 6:
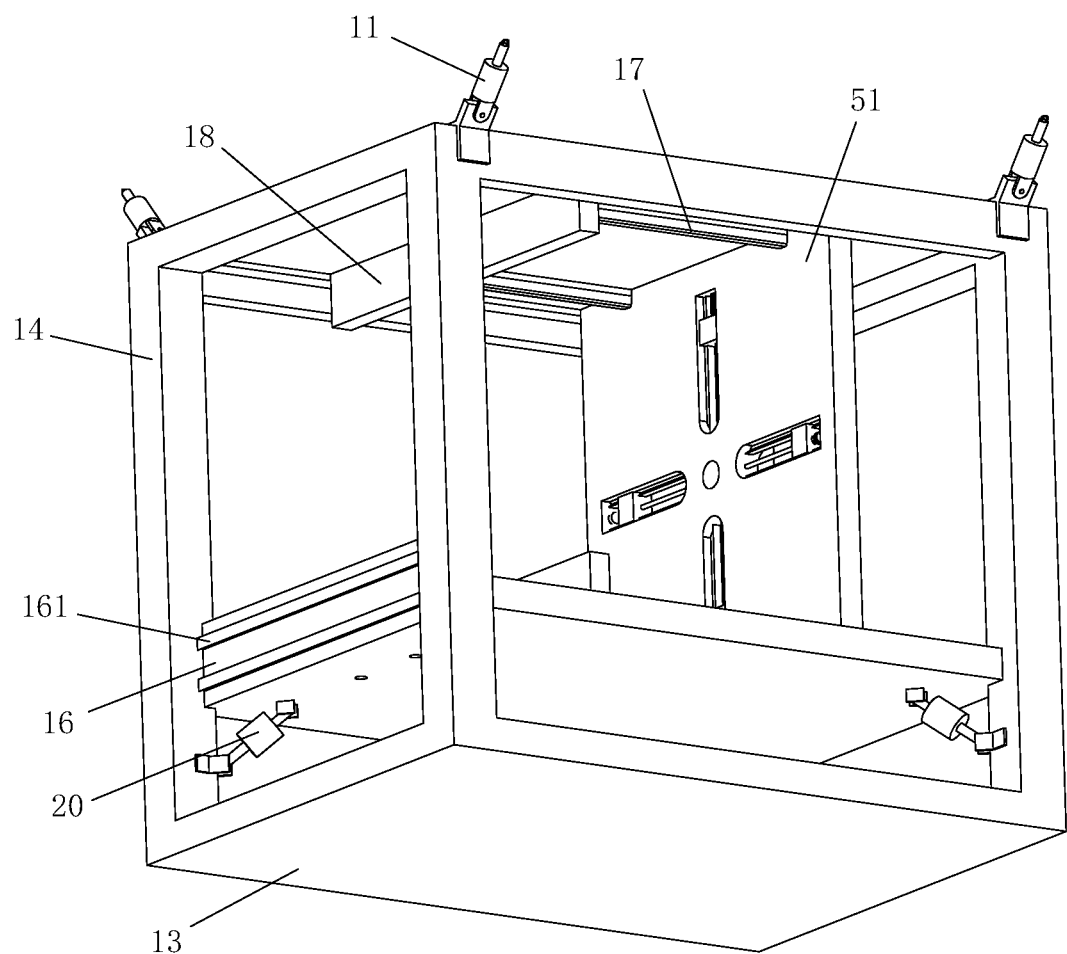
FIG. 6 is a second schematic structural diagram of the hanging basket of the present disclosure.

Further, as shown in FIG. 5 and FIG. 6, the hanging basket 1 is of an overall structure, and includes a top plate 12 and a bottom plate 13 that are arranged in parallel, and vertical posts 14 for connecting the top plate 12 and the bottom plate 13; a partition plate 15 which is arranged horizontally is arranged between the top plate 12 and the bottom plate 13; a mounting plate 16 which is perpendicular to the partition plate 15 and is fixed to the vertical posts at the front end of the hanging basket 1 is arranged at the front end of the partition plate 15; the cleaning and spraying mechanism 4 and the spring reaction force regulation mechanism 5 are mounted between the top plate 12 and the partition plate 15; the grinding mechanism 3 is fixed to the outer plate surface of the mounting plate 16; guide rails 17 are respectively and symmetrically arranged on the lower plate surface of the top plate 12 and the upper plate surface of the partition plate 15; the arrangement direction of the guide rails 17 coincides with the front-back direction of the hanging basket 1; a baffle plate 18 is arranged at the front ends of the guide rails 17; a third vertical plate 51 is arranged at the rear ends of the guide rails 17; rollers 421 in rolling fit with the guide rails 17 are respectively arranged on the upper end surface and the lower end surface of a second vertical plate 42; the upper end surface and the lower end surface of the third vertical plate 51 are respectively and fixedly connected to the top plate 12 and the partition plate 15.

Figure 11:
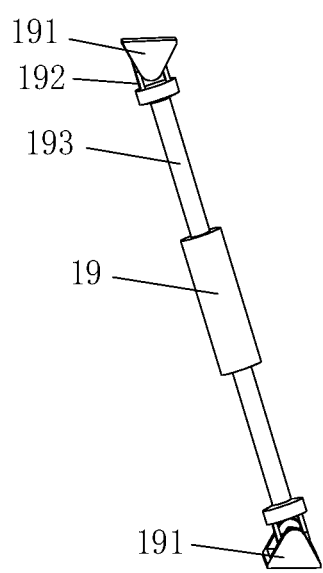
FIG. 11 is a schematic structural diagram of a magnetorheological damper of the present disclosure.

As shown in FIG. 1 and FIG. 11, magnetorheological dampers 19 for connecting the hanging basket 1 and the top surface of the wall are further arranged therebetween. The magnetorheological dampers 19 have the main functions of improving the rigidity and the stability of the hanging basket 1 and ensuring the operation quality without affecting the pulling operation of the first traction mechanism. In the present embodiment, three groups of the magnetorheological dampers 19 are arranged, and are uniformly distributed along the circumference of the top center of the hanging basket 1 at an interval of 120 degrees. Both ends of the magnetorheological damper 19 are mounted by using steller hinges 191. The steller hinges 191 are connected to connecting pin heads 192 of the magnetorheological damper 19 through second candan universal joints, which can realize the rotation of 180 degrees between the magnetorheological damper 19 and each steller hinge 191. When the first traction mechanism performs pulling and locating, current is not conducted into the magnetorheological damper 19. At this moment, a piston rod 193 stretches and retracts freely in the magnetorheological damper 19, which ensures the stability and rapidness of a traction process, and meanwhile, reduces the stress born by the first rope 22. When the cleaning and spraying mechanism 4 and the grinding mechanism 3 work, current is conducted into the magnetorheological damper 19. Under the action of the current, the magnetorheological damper 19 has a very strong inhibiting effect on the stretching and retracting of the piston rod 193. Meanwhile, under the combined action of the three groups of the magnetorheological dampers 19, the rigidity of the overall mechanism is improved; the accuracy and the stability of location are ensured; the vibration of the hanging basket 1 in a working process is also reduced; the work stability is improved.

Double-ended magnetorheological dampers 20 for connecting the bottom surface of the partition plate 15 and the vertical posts 14 are arranged therebetween. Four groups of the double-ended magnetorheological dampers 20 are arranged. One end of the double-ended magnetorheological damper 20 is hinged to an upper connecting pin seat 201 arranged on the partition plate 15, and the other end of the double-ended magnetorheological damper 20 is hinged to a lower connecting pin seat 202 arranged on the vertical post 14. When the robot vibrates in the working process, the double-ended magnetorheological dampers 20 may respond quickly, and rotate relative to the upper connecting pin seat 201 and the lower connecting pin seat 202, thereby inhibiting the vibration effectively.

Figure 7:
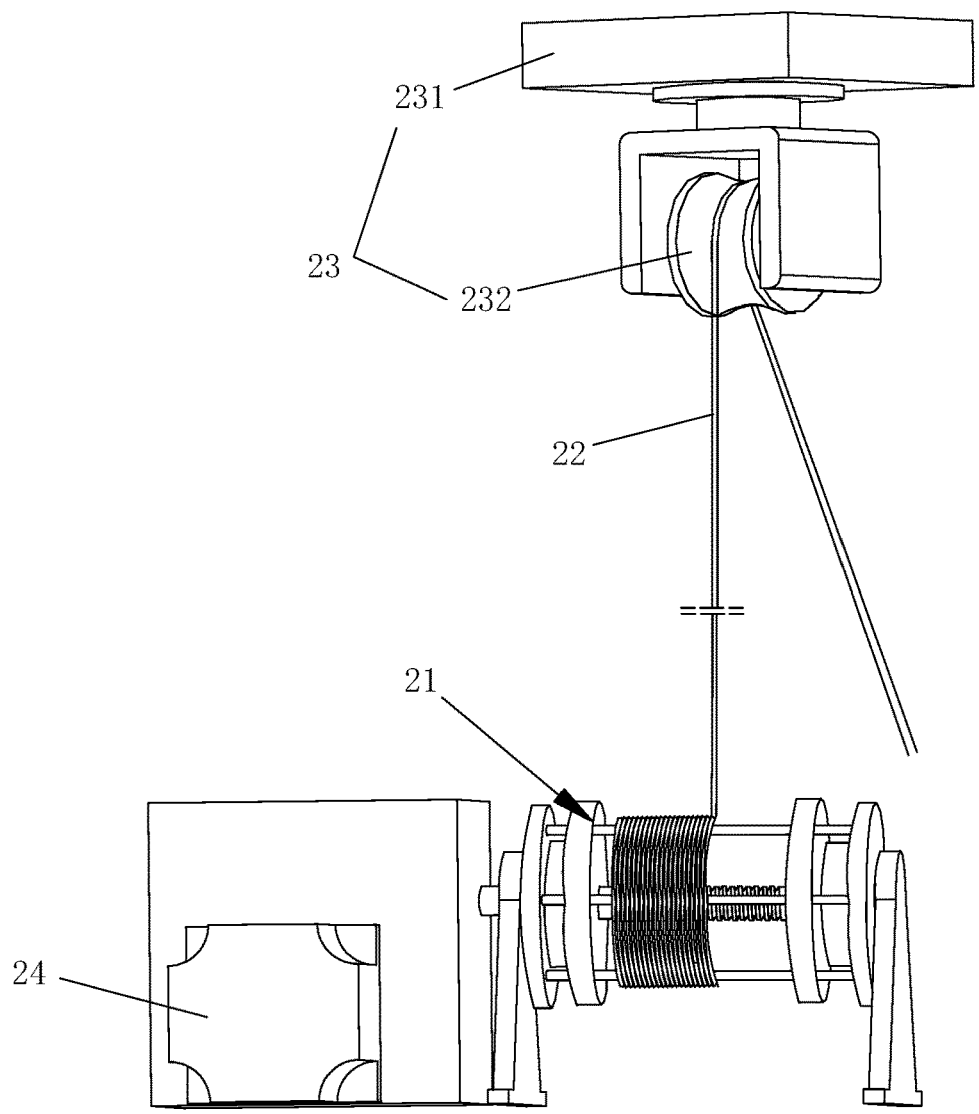
FIG. 7 is a schematic structural diagram of a first traction mechanism of the present disclosure.

Further, as shown in FIG. 7, the first traction mechanism includes first ropes 22 for connecting the hanging basket 1 and the first rope winding mechanism 21. One end of the first rope 22 is connected to the first rope winding mechanism 21 fixed to the ground, and the other end of the first rope 22 is connected to a single-ended magnetorheological damper 11 arranged at the top of the hanging basket 1 after surrounding through a first pulley block 23 fixed to the top surface of a wall. The other end of the single-ended magnetorheological damper 11 is connected to the top end of the hanging basket 1 through a pin shaft. The first rope winding mechanism 21 is driven to rotate by a first driving motor 24 to realize the winding and unwinding of the first rope 22. The winding and unwinding of the first rope 22 are used for regulating the movement of the hanging basket 1 of three degrees of freedom in space, that is, the first driving motor 24 controls the rotating speed and the rotating direction of a first rope winding mechanism 21. The movement and location of the hanging basket 1 of three degrees of freedom may be realized within a wide range by pulling the single-ended magnetorheological damper 11 at the four corners of the upper end of the hanging basket 1 through the first ropes 22. In pulling and locating processes of the hanging basket 1, the vibration produced by the hanging basket 1 in the pulling and locating processes may be effectively prevented and the hanging basket 1 may also be located accurately by changing the current flowing through the single-ended magnetorheological damper 11.

Figure 8:
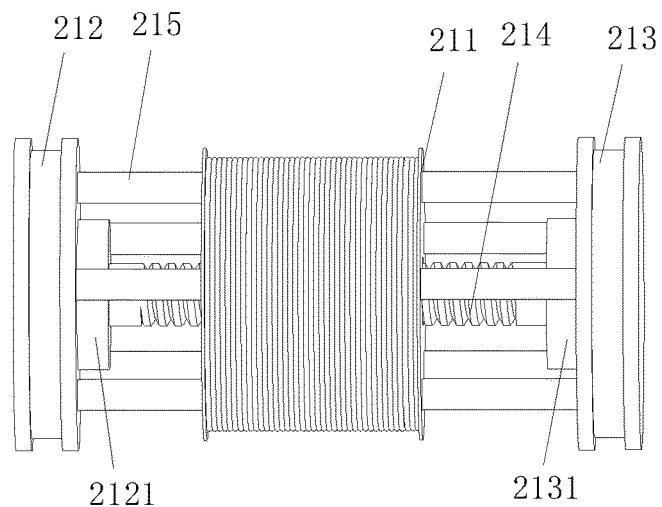
FIG. 8 is a schematic structural diagram mechanism of a first rope winding mechanism of the present disclosure.
Figure 9:
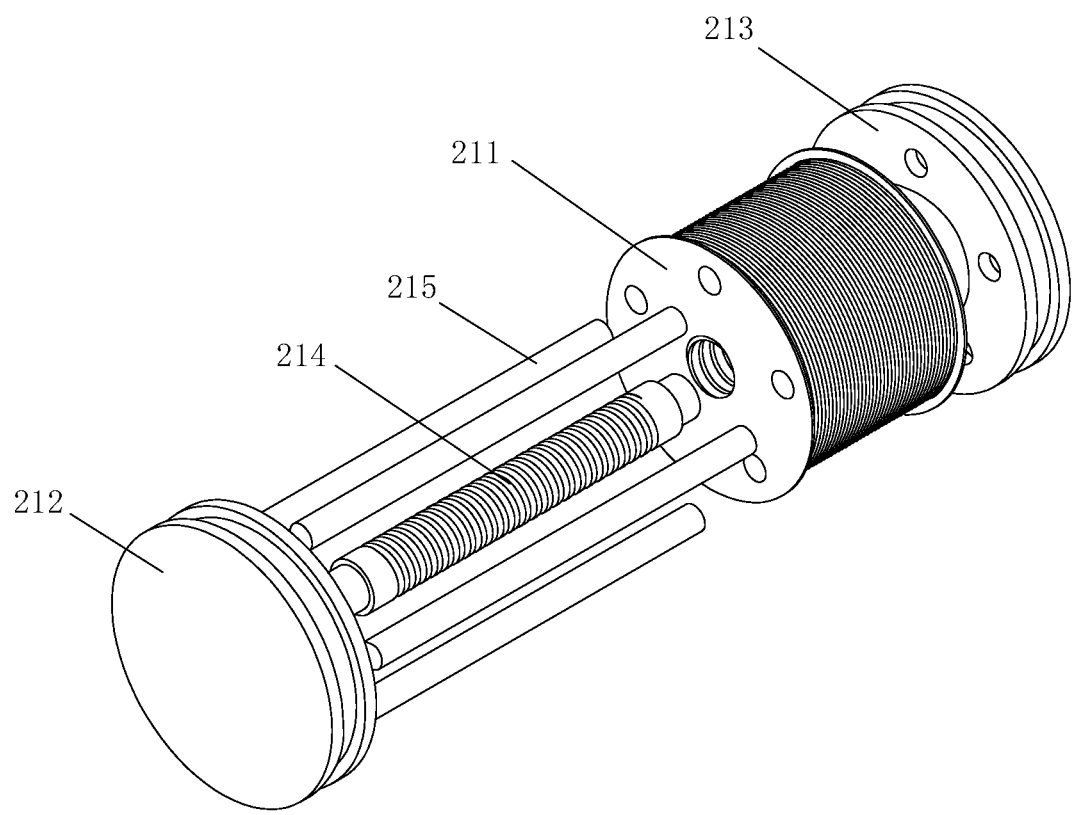
FIG. 9 is an exploded schematic structural diagram of the first rope winding mechanism of the present disclosure.
Figure 10:
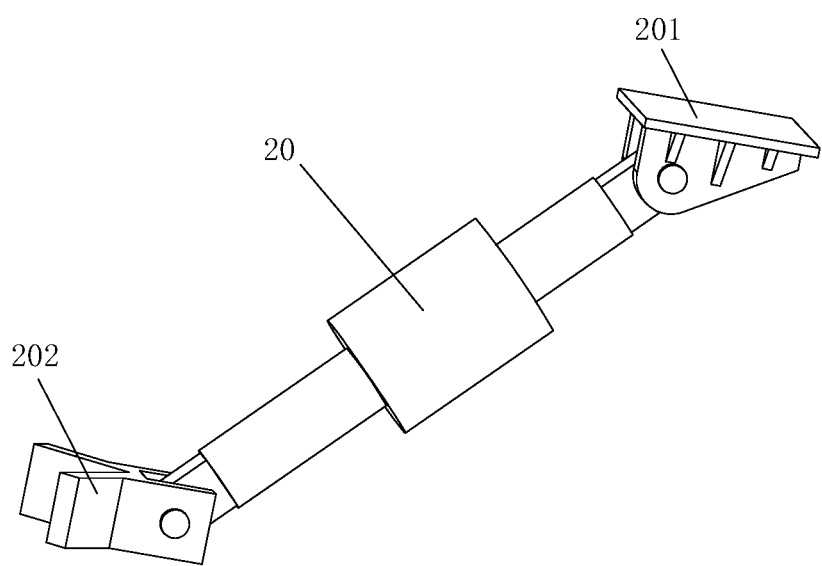
FIG. 10 is a schematic structural diagram of the double-ended magnetorheological damper of the present disclosure.

As shown in FIG. 7, the first pulley block 23 includes a first pulley mounting seat 231 fixed to the top surface of the wall and a first pulley 232 arranged on the first pulley mounting seat 231. As shown in FIG. 8 and FIG. 9, the first rope winding mechanism 21 includes a drum 211 used for winding the first rope 22, and a left end cover 212 and a right end cover 213 arranged on the two sides of the drum 211. A first boss 2121 and a second boss 2131 are respectively arranged in the centers of the end surfaces, close to each other, of the left end cover 212 and a right end cover 213. The first boss 2121 and the second boss 2131 are respectively in rotating fit with the left end cover 212 and the right end cover 213. A roller shaft 214 which is fixedly connected to the first boss 2121 and the second boss 2131 is arranged at the centers thereof. The drum 211 is arranged on the roller shaft 214 in a sleeving manner, and the drum 211 is in threaded connection with the roller shaft 214. Rotating shafts 215 which penetrate through the drum 211 are uniformly distributed in the circumferential direction of the roller shaft 214. Two ends of the rotating shaft 215 are respectively fixedly connected to the left end cover 212 and the right end cover 213. A threaded section matched with the drum 211 is arranged on the roller shaft 214. A threaded hole matched with the threaded section is formed in the drum 211. The rotating shaft 215 is a polished shaft. A polished hole which is in transition fit with the rotating shaft 215 is formed in the drum 211. Specifically, the two ends of the roller shaft 214 are respectively connected to the first boss 2121 and the second 2131 arranged at the centers the left end cover 212 and the right end cover 213. The two ends of the rotating shaft 215 are respectively fixedly connected to the left end cover 212 and the right end cover 213. A threaded section matched with the drum 211 is arranged on the roller shaft 214. A threaded hole matched with the threaded section is formed in the drum 211. The rotating shaft 215 is a polished shaft. A polished hole which is in transition fit with the rotating shaft 215 is formed in the drum 211. An output end of the first driving motor 24 is connected to the outer side of the left end cover 212. During working, the first boss 2121, the second 2131, and the roller shaft 214 are stationary. The first driving motor 24 drives the left end cover 212 to rotate. The rotating shaft 215, the drum 211, and the right end cover 213 rotate synchronously. The drum 214 moves horizontally relative to the roller shaft 214 and the rotating shaft 215 while rotating under the action of a threaded pair, and the winding and unwinding control of the first rope 22 may be realized by the rotation of the drum 211. Preferably, the thread pitch of the roller shaft 214 and the width of the first rope 22 may be set to be the same. In such a manner, for every revolution of the drum 211, the movement distance is equal to the threaded pitch of the roller shaft 214; the contact point between the first rope 22 and the drum 211 is kept at the same point all the time, which ensures a constant ratio of the change of the length of the first rope 22 to the rotation angle of the first drive motor 24.

In the present embodiment, four groups of the first ropes 22, the first rope winding mechanisms 21, the first driving motors 24, the first pulley blocks 23, and the single-ended magnetorheological dampers 11 are respectively arranged, and the four groups of the single-ended magnetorheological dampers 11 are respectively located at four corners of the top of the hanging basket 1.

Figure 12:
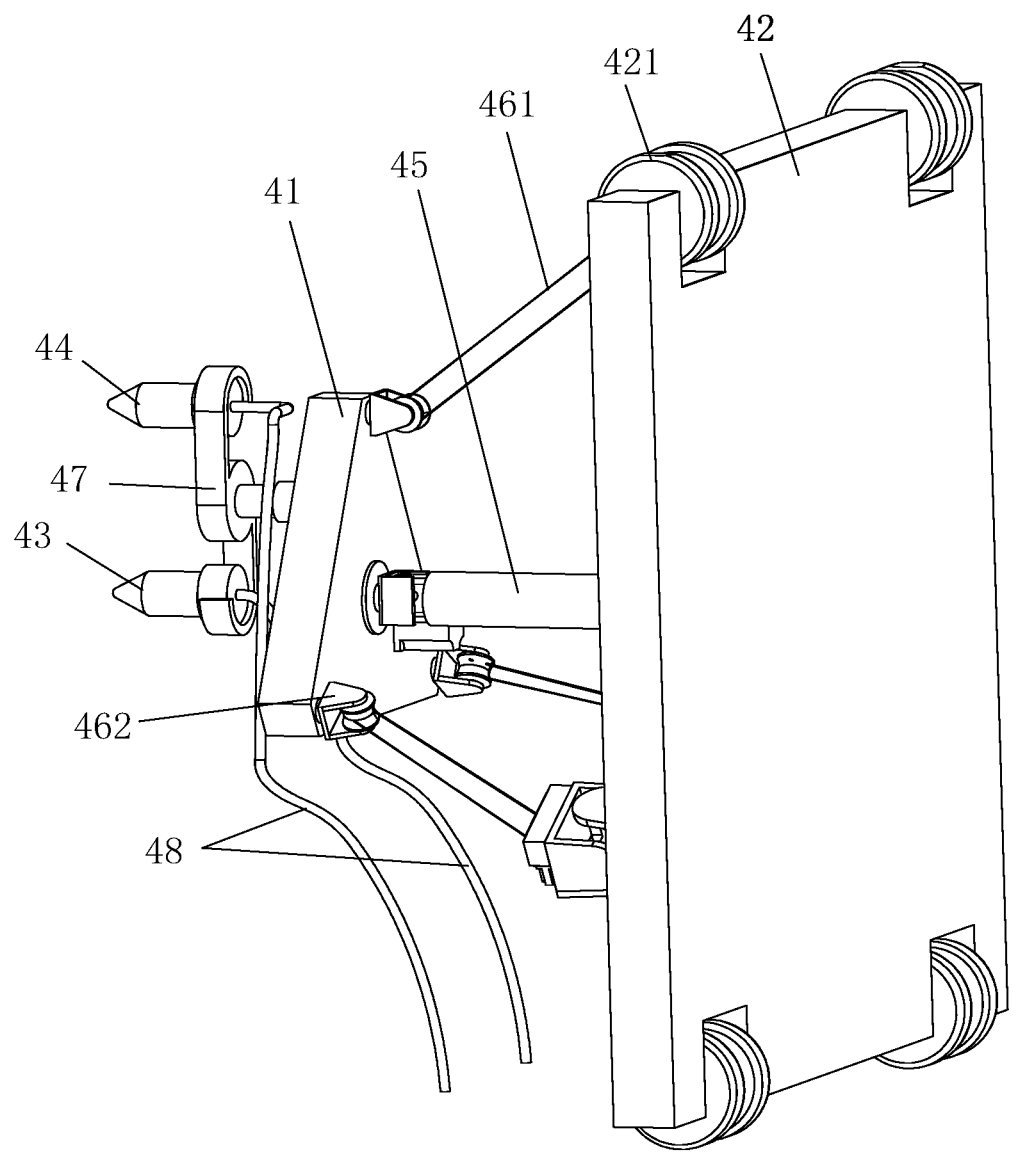
FIG. 12 is a first schematic diagram of the cleaning and spraying mechanism of the present disclosure.
Figure 13:
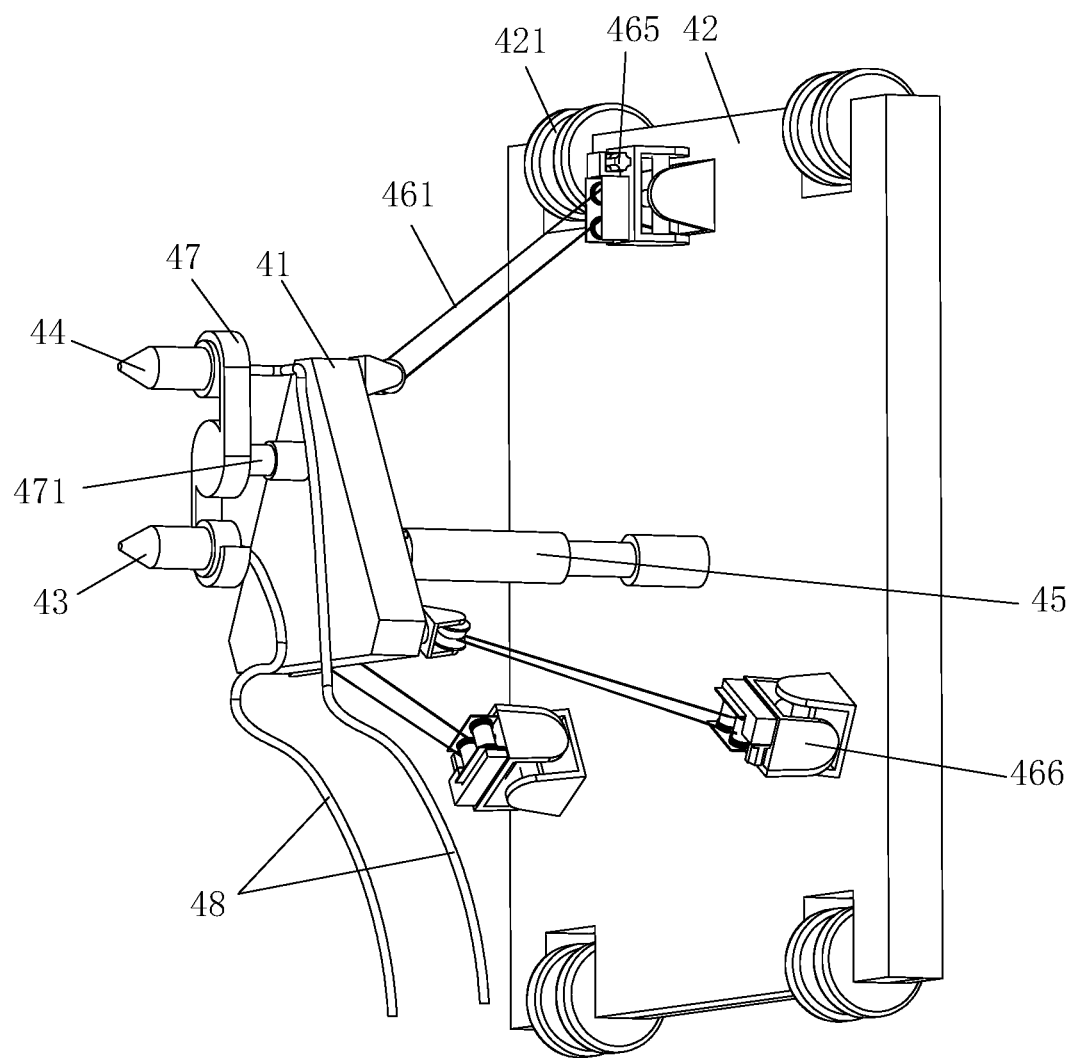
FIG. 13 is a second schematic diagram of the cleaning and spraying mechanism of the present disclosure.

Further, as shown in FIG. 12 and FIG. 13, the cleaning and spraying mechanism 4 includes first vertical plate 41 and a second vertical plate 42 that are arranged in parallel in a vertical direction. A cleaning nozzle 43 and a spraying nozzle 44 are mounted on the first vertical plate 41. Both the cleaning nozzle 43 and the spraying nozzle 44 are fixed to an S-shaped nozzle gripper 47. A rotary shaft 471 in rotating fit with the outer plate surface of the first vertical plate 41 is arranged at the center of the S-shaped nozzle gripper 47. Under the driving of a motor, the rotary shaft 471 completes a rotation of 0 to 180 degrees to switch the cleaning nozzle 43 and the spraying nozzle 44. The cleaning nozzle 43 and the spraying nozzle 44 are located at the central position of the second vertical plate 42 when in a working state, that is, the nozzle works only when either the cleaning nozzle 43 or the spraying nozzle 44 is located at the central position of the first vertical plate 41. The cleaning nozzle 43 and the spraying nozzle 44 are respectively connected to a cleaning liquid barrel 431 and a paint barrel 441 arranged at the bottom plate of the hanging basket through connecting pipes 48. That is, the motor makes the rotary shaft 471 rotate to drive the nozzle gripper 47 to rotate, so that the cleaning nozzle 43 or the spraying nozzle 44 are located in a working area, namely, located at the central position of the first vertical plate 41. A displacement sensor and an industrial camera are further arranged on the nozzle gripper 47.

Figure 15:
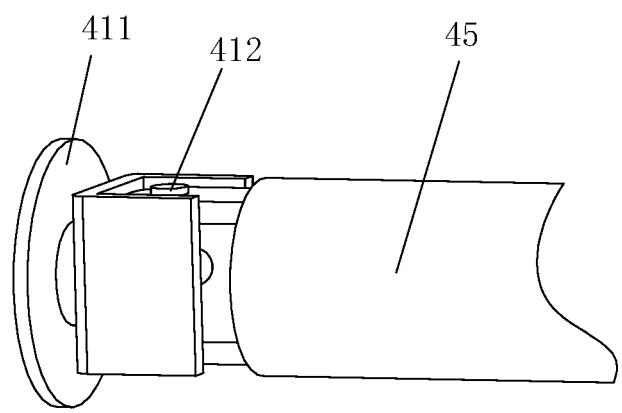
FIG. 15 is a schematic structural diagram of a telescopic rod of the present disclosure.

A telescopic rod 45 and a second traction mechanism for connecting the first vertical plate 41 and the second vertical plate 42 are arranged therebetween. As shown in FIG. 15, the telescopic rod 45 is connected at the centers of the first vertical plate 41 and the second vertical plate 42. One end of the telescopic rod 45 is connected to a connecting pin 411 arranged on the first vertical plate 41 through a candan universal joint 412, and the other end of the telescopic rod 45 is fixedly connected to the second vertical plate 42. The telescopic rod 45 is driven by a first linear motor arranged therein. The stretching and retracting of the telescopic rod 45 make the first vertical plate 41 move back and forth relative to the hanging basket 1.

Figure 14:
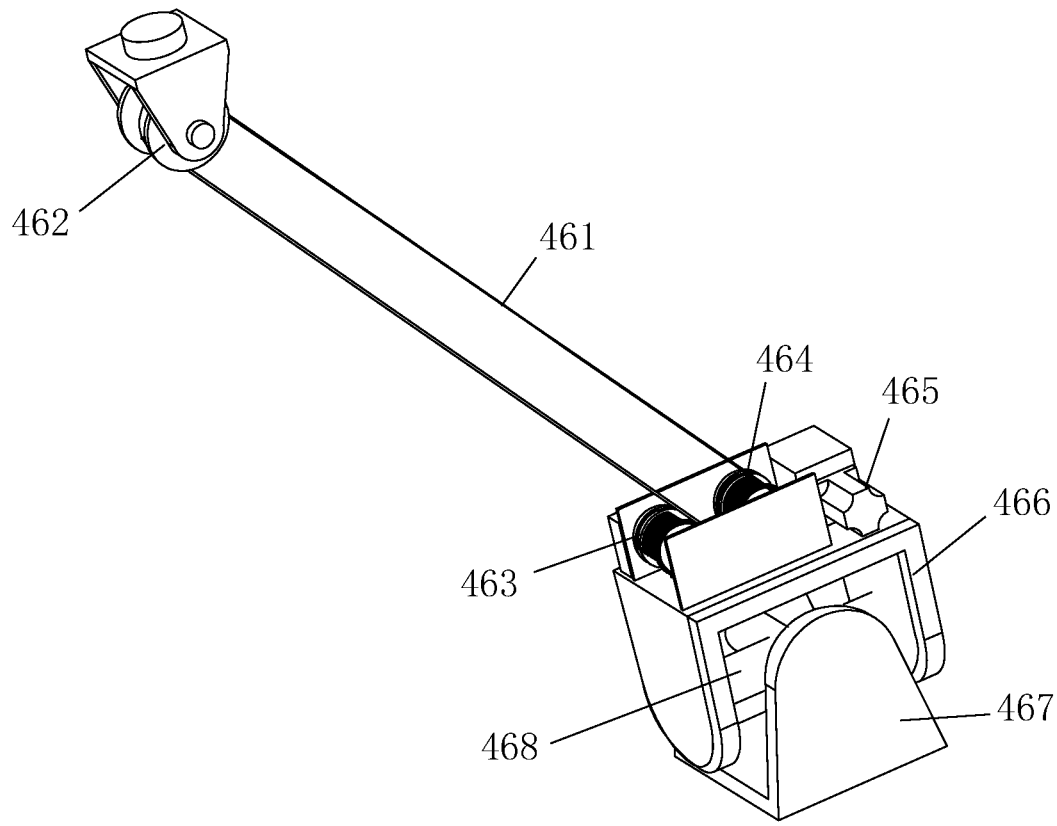
FIG. 14 is a schematic structural diagram of a second traction mechanism of the present disclosure.

As shown in FIG. 14, the second traction mechanism includes second ropes 461, second pulley blocks 462 fixed to the first vertical plate 41, and second rope winding mechanisms 463 and third rope winding mechanisms 464 fixed to the second vertical plate 42. One end of the second rope 461 is connected to the second rope winding mechanism 463, and the other end of the second rope 461 is connected to the third rope winding mechanism 464 after surrounding through the second pulley block 462. The second rope winding mechanism 463 and the third rope winding mechanism 464 are driven by a second driving mechanism 465.

The rotating directions of the second rope winding mechanism 463 and the third rope winding mechanism 464 are opposite during working, that is, when one end is clockwise, and the other end is anticlockwise, so as to realize the angular rotation of the first vertical plate 41, and meanwhile, ensure the tensioning of the second rope 461, thereby forming a balance rope system. Before and after working, the rotating directions of the second rope winding mechanism 463 and the third rope winding mechanism 464 are the same, which can realize the lengthening and shortening of the second rope 461, and control the first vertical plate 41 to move back and forth. The second rope winding mechanism 463, the third rope winding mechanism 464, and the second driving mechanism 465 are all fixed to an upper steller hinge 466. A lower steller hinge 467 matched with the upper steller hinge 466 is fixed to the second vertical plate 42. A first candan universal joint 468 for connecting the upper steller hinge 466 and the lower steller hinge 467 is arranged therebetween. The second traction control mechanism controls the first vertical plate 41 to realize the adjustment of a pitch angle.

In the present embodiment, the first vertical plate 41 is a plate in an equilateral triangle shape. Three groups of the second ropes 461, the second pulley blocks 462, the second rope winding mechanisms 463, the third rope winding mechanisms 464, and the second driving motors 465 are respectively arranged, where the second pulley blocks 462 are located at the three angles of the first vertical plate 41. The third rope winding mechanisms 464 and the second driving motors 465 are respectively and uniformly distributed along the center of the first vertical plate 41 at an interval of 120 degrees.

Figure 16:
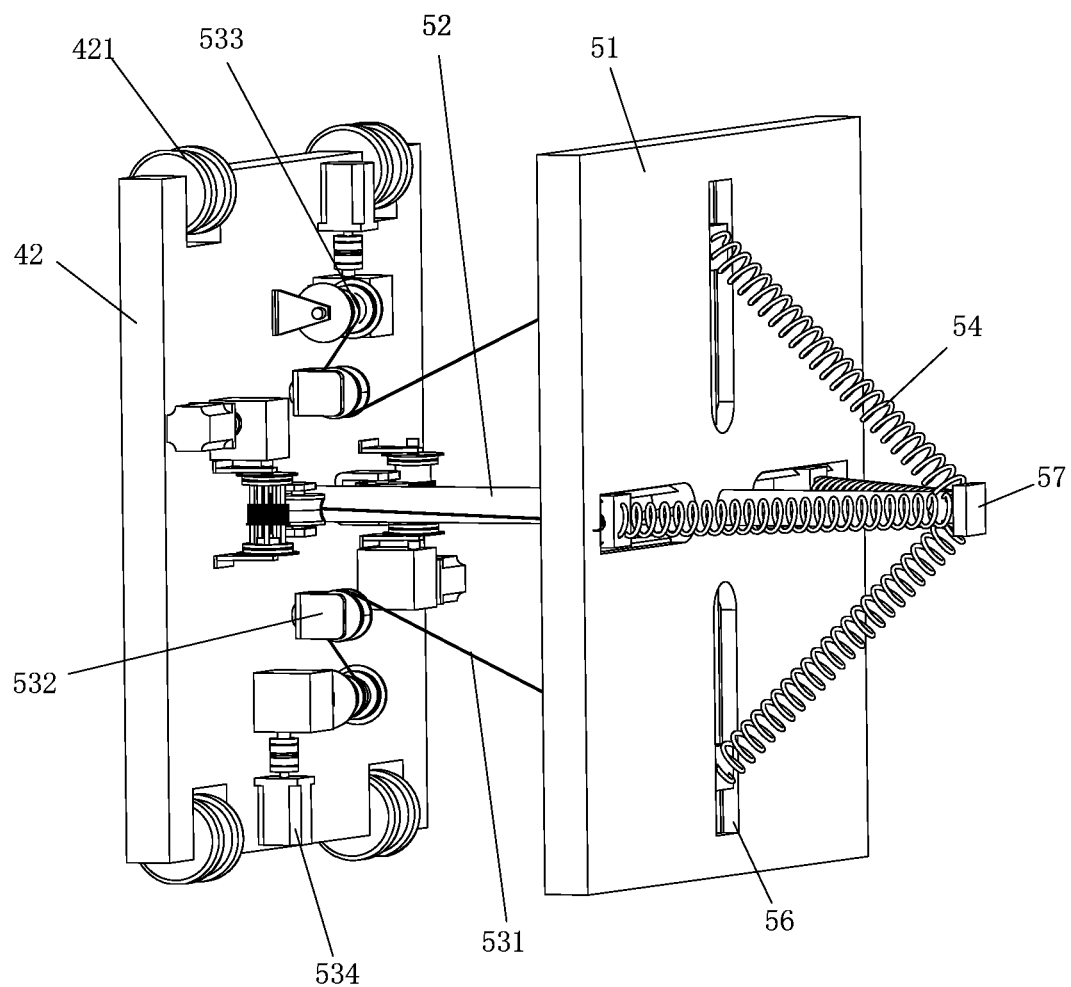
FIG. 16 is a first schematic diagram of a spring reaction force regulation mechanism of the present disclosure.
Figure 17:
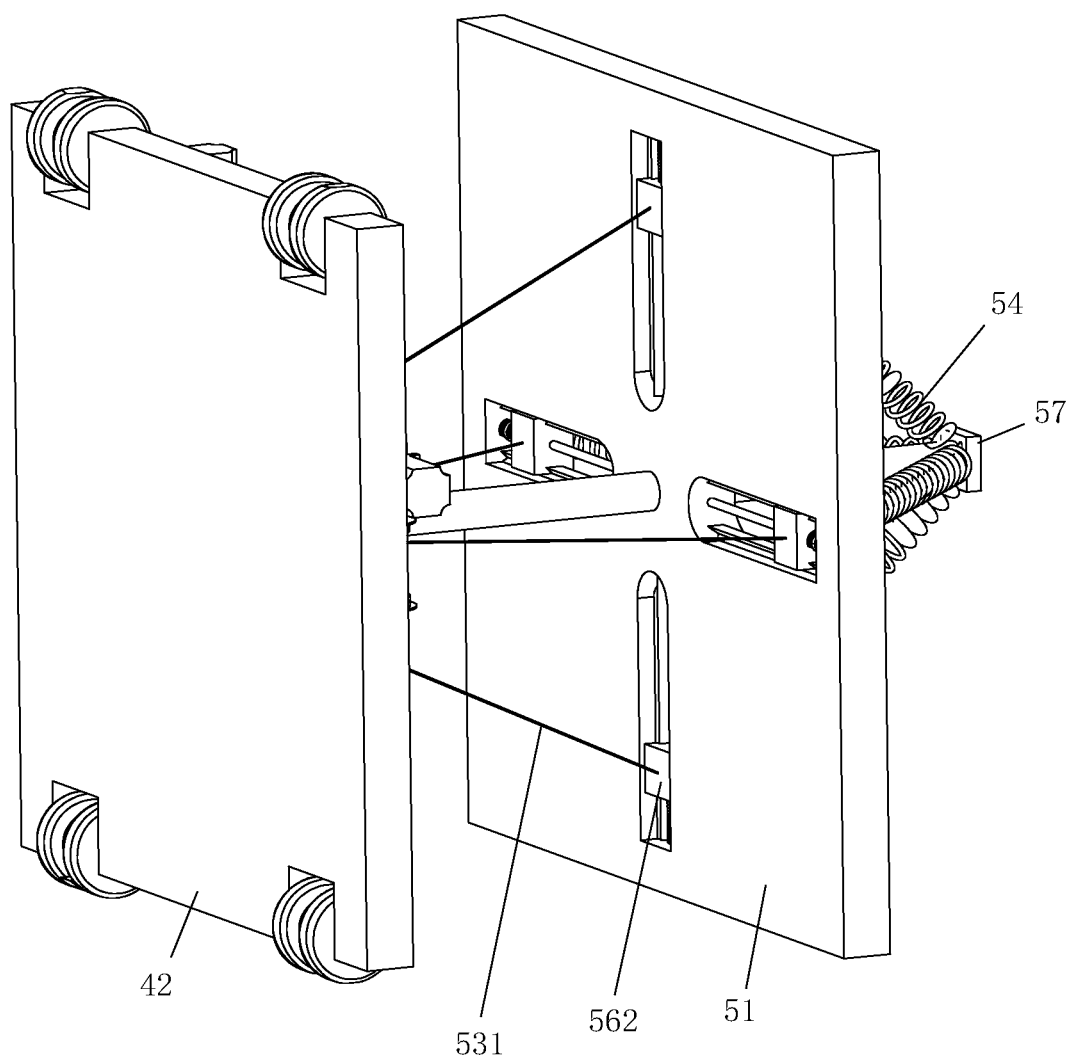
FIG. 17 is a second schematic diagram of the spring reaction force regulation mechanism of the present disclosure.

Further, as shown in FIG. 16 and FIG. 17, the spring reaction force regulation mechanism 5 includes a third vertical plate 51 that is parallel to the second vertical plate 42. The second vertical plate 42 is located between the first vertical plate 41 and the third vertical plate 51, and may move in the front-back direction of the hanging basket 1. The third vertical plate 51 is fixedly connected to the hanging basket 1. A rigid rod 52 for connecting the third vertical plate 51 and the second vertical plate 42 and a third traction mechanism are arranged therebetween. One end of the rigid rod 52 is fixedly connected to the second vertical plate 42, and the other end of the rigid rod 52 is connected to springs 54 arranged on the third vertical plate 51 after penetrating through the third vertical plate 51 vertically. The thrust and reaction force stressed on the cleaning and spraying mechanism 4 may be balanced by the change of the lengths of the springs 54 and the change of an included angle between each of the springs 54 and the rigid rod 52.

Figure 18:
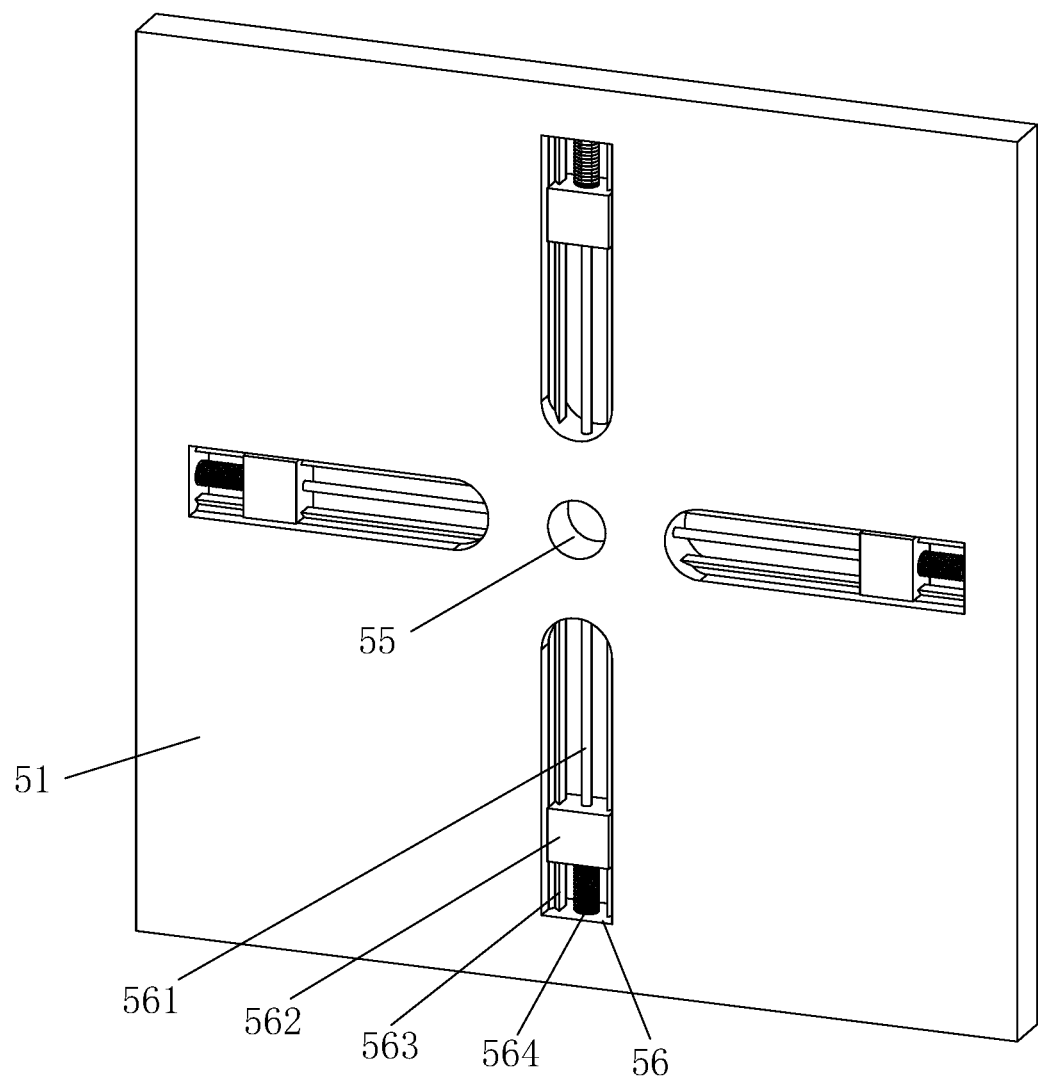
FIG. 18 is a schematic structural diagram of a third vertical plate of the present disclosure.

As shown in FIG. 18, a rigid rod hole 55 matched with the rigid rod 52 is formed in the center of the third vertical plate 51. The rigid rod 52 is connected to the rigid rod hole 55 through a prismatic joint, and the rigid rod 52 may move in the axial direction of a third platform 51. Four through grooves 56 which are perpendicular to the rigid rod 52 are uniformly distributed in the circumferential direction of the rigid hole 55. A central shaft 561 is arranged in the center of the through groove 56 in the length direction of the through groove 56. A mass block 562 is arranged on the central shaft 561 in a sleeving manner. The mass block 562 is in sliding fit with moving guide rails 563 arranged on the groove walls on the two sides of the through groove 56. An extension spring 564 is arranged at one end, far away from the rigid rod hole 55, of the central shaft 561 in a sleeving manner. One end of the extension spring 564 is fixed to the mass block 562, and the other end of the extension spring 564 is fixed to the groove wall of the through groove 56. The end surface, close to the second vertical plate 42, of the mass block 562 is connected to the third traction mechanism. The end surface, far away from the second vertical plate 42, of the mass block 562 is connected to the spring 54 through a spring fixing terminal. The other end of the spring 54 is connected to an end part of the rigid rod 52 through a spring knot 57.

The third traction mechanism includes third ropes 531, and third pulley blocks 532 and fourth rope winding mechanisms 533 fixed to the second vertical plate 42. One end of the third rope 531 is connected to the mass block 562, and the other end of the third rope 531 is connected to the fourth rope winding mechanism 533 after surrounding through the third pulley block 532. The fourth rope winding mechanisms 533 is driven by a third driving motor 534.

In the present embodiment, four groups of the second ropes 531, the second pulley blocks 532, the second rope winding mechanisms 533, and the third driving motors 534 are respectively arranged. The third pulley blocks 532, the fourth rope winding mechanisms 533, and the third driving motors 534 are all arranged on the second vertical plate 42, and are arranged at an angle of 90 degrees in a circumferential direction.

In the present embodiment, the structures of the second pulley blocks 462 and the third pulley blocks 532 are all the same as those of the first pulley blocks 23, and the structures of the second rope winding mechanisms 463, the third rope winding mechanisms 464, and the fourth rope winding mechanisms 533 are all the same as those of the first rope winding mechanisms 21, which are not described in detail herein. The rope winding mechanisms of the present disclosure can effectively reduce oscillation and friction phenomena generated by the ropes during a winding process, and can also improve the accuracy and the stability of the movement output under the control of the ropes, which improves the work quality and the work stability.

Figure 19:
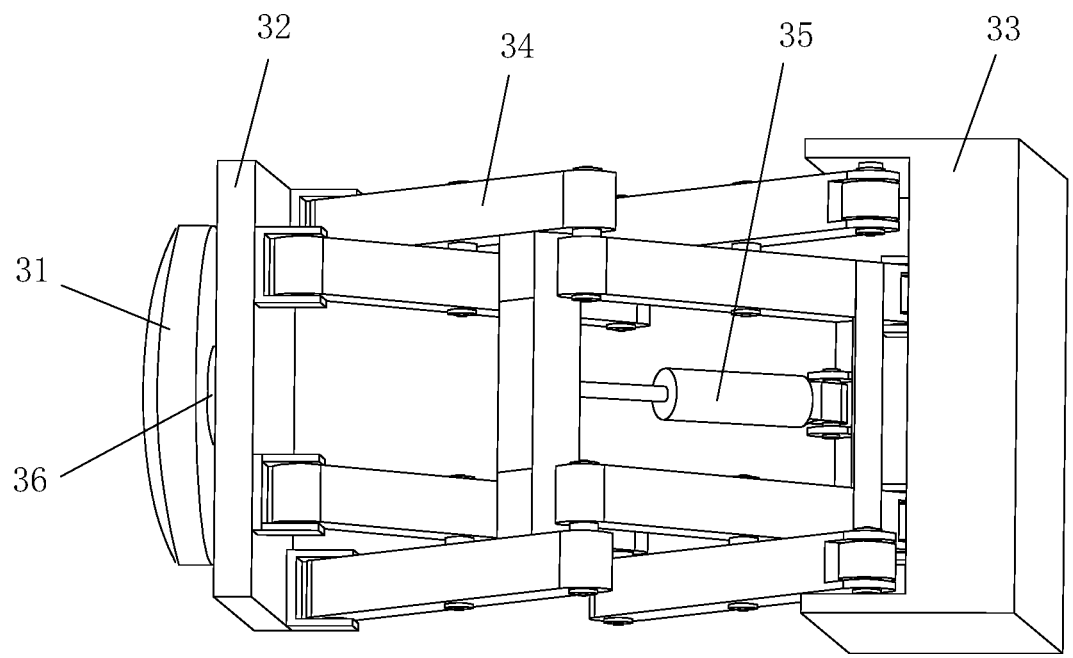
FIG. 19 is a schematic structural diagram of a grinding mechanism of the present disclosure.
Figure 20:
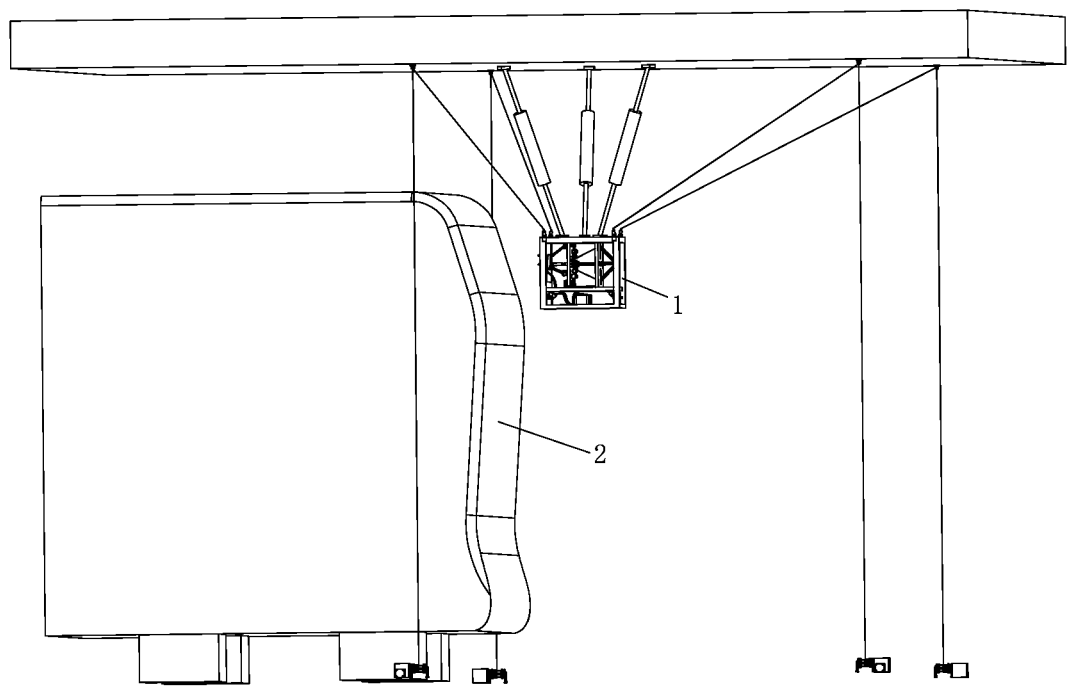
FIG. 20 is a use state diagram of the present disclosure.

Further, as shown in FIG. 19, the grinding mechanism 3 includes a grinding head 31 and a telescopic mechanism for connecting the grinding head 31 and the hanging basket 1. The telescopic mechanism includes a first fixed table 32 and a second fixed table 33 that are arranged in parallel in the vertical direction. A lifting scissors mechanism 34 for connecting the first fixed table 32 and the second fixed table 33 is arranged therebetween. The lifting scissors mechanism 34 is driven by a hydraulic cylinder 35. The grinding head 31 is connected to the outer side surface of the first fixed table 32 through a spherical hinge 36. A first motor for driving the grinding head 31 to rotate is arranged in the first fixed table 32. The grinding head 31 is connected to the spherical hinge 36, so that the grinding head 31 can be adjusted at an angle of +/−15 degrees in space range. The second fixed table 33 is matched and fixed to horizontal sliding rails 161 arranged on a mounting plate 16 of the hanging basket 1. The second fixed table 33 may move left and right in the direction limited by the horizontal sliding rails 161. A second linear motor for driving the second fixed table 33 to move along the horizontal sliding rails 161 and a second motor for driving a hydraulic cylinder 35 to act are arranged in the second fixed table 33. The grinding mechanism 3 is mounted in front of the hanging basket 1 and below the cleaning and spraying device 4. During working, the second fixed table 33 may be driven to move along the horizontal sliding rails 161 through the second linear motor, so as to realize left-right movement of the grinding head 31 in front of the hanging basket 1. The lifting scissors mechanism 34 is ascended and descended by driving the hydraulic cylinder 35 to act through the second motor, so that the movement of the first fixed table 32 in the front-back direction is realized. Automatic tilting of the grinding head 31 in a grinding process can be realized through the spherical hinge 36.

Working principles of the present disclosure are as follows:

1. A working principle of the cleaning and spraying mechanism is as follows:

at the beginning of work, the telescopic rod 45 stretches, so that the cleaning and spraying mechanism reaches a working area. At this moment, both the second rope winding mechanisms 463 and third rope winding mechanisms 464 are driven, and the second rope winding mechanisms 463 and the third rope winding mechanisms 464 are driven to rotate synchronously anticlockwise by taking the pulling force generated by the second ropes 461 during a stretching process of the telescopic rod 45 as a driving force. When a curved surface is cleaned and sprayed, data are transmitted to a controller through a displacement sensor and an industrial camera on the nozzle gripper 47, and the controller controls the second driving motor 465 to work. When the second rope winding mechanisms 463 rotate clockwise to wind the second ropes 461, the third rope winding mechanisms 464 are driven, and the power for its clockwise rotation is the pulling force of the second ropes 461. On the contrary, the third rope winding mechanisms 464 are active, while the second rope winding mechanisms 463 are passive, which ensures the tensioning of the second ropes 461. Under the combined action of the three groups of the second traction mechanisms, the first vertical plate 41 may rotate at −135 and 135 degrees in a space range, which ensures that the cleaning nozzle 43 and the spraying nozzle 44 are perpendicular to an operation object all the time. On another aspect, the controller controls the first linear motor in the telescopic rod 45 to realize the stretching and retracting of the telescopic rod 45 in length, which ensures a constant distance between the two nozzles and the operation object, and ensures the work quality. At the end of the cleaning and spraying work, the telescopic rod 45 retracts, so that the cleaning and spraying mechanism 4 returns into the hanging basket 1. The second rope winding mechanism 463 and the third rope winding mechanism 464 synchronously rotate clockwise, which ensures the tensioning of the second ropes 461 in a retracting process of the telescopic rod 45.

2. A working principle of the spring reaction force regulation mechanism is as follows:

when the cleaning and spraying mechanism 4 does not work, the baffle plate 18 is in contact with the rollers 421, and the force applied to the second vertical plate 42 by the baffle plate 18 is equal to the axial component force of the springs 54 acting on the rigid rod 52, which ensures that the length, penetrating through the third vertical plate 51, of the rigid rod 52 is fixed, thereby making all of the springs 54 in a tensile state. When the extension spring 564 is in an initial state, the distance between the third pulley block 532 and the mass block 562 is the furthest, and the third ropes 531 are in a tensioned state. During a working process of the cleaning and spraying mechanism 4, the stress condition of the mechanism is transmitted to the controller through a force sensor arranged on the first vertical plate, and the controller controls the third driving motor 534, so as to realize the steering and stroke of the fourth rope winding mechanism 533. When the reaction force stressed on the cleaning and spraying mechanism 4 is increased, the fourth rope winding mechanism 533 rotates to drive the third ropes 531 to wind. At the moment, the pulling force applied to the mass block 562 by the third rope 531 is an active force, the axial component force of the active force makes the mass block 562 move in the axial direction of the central shaft 561 and the moving guide rails 563. When the reaction force stressed on the cleaning and spraying mechanism 4 is decreased, the fourth rope winding mechanism 533 rotates to drive the third ropes 531 to loose. The connecting sides of the mass block 562 and the third rope 531 are not stressed, at the moment, the tension spring 564 is in a tensile state; the pulling force of the tension spring 564 is an active force, and the mass block 562 leaves away from the center in the axial direction, so that the third rope 531 is in a tensile state all the time, thereby changing the pulling force of the rigid rod 52 applied by the springs 54 is changed by the change of the lengths of the springs 54 and the change of an included angle between each of the springs 54 and the rigid rod 52, and changing the thrust of the cleaning and spraying mechanism 4 applied by the rigid rod 52. Under the combined action of the four groups of the springs 54, the thrust stressed on the cleaning and spraying mechanism 4 is balanced with the reaction force stressed thereon, which ensures the stability in cleaning and spraying processes, and effectively improves the work quality.

3. A working principle of the grinding mechanism is as follows:

during a grinding stage, the controller controls the hydraulic cylinder 56 to stretch and retract according to the data transmitted by the displacement sensor, so that the grinding head 31 is in contact with the surface of an operation object, and makes the objection object have certain pressure. The grinding head 31 is driven to rotate to start grinding work by the motor arranged in the first fixed table 32. During a grinding process, the second linear motor in the second fixed table 33 makes the grinding mechanism 3 move on the mounting plate 16 along the horizontal sliding rails 161. The second motor in the second fixed table 33 controls the hydraulic cylinder 35 to act in real time, so as to realize stretching and retracting of the lifting scissors mechanism 34. Certain pressure is kept between the grinding head 31 and a ground object all the time, and the grinding head 31 can be tilted automatically according to the shape of the ground object, thereby improving the grinding flexibility and the grinding quality. At the end of grinding, the second motor controls the hydraulic cylinder 35 to retract.

The present disclosure has the following beneficial effects:

1. The rope traction type grinding, cleaning, and coating integrated operation robot uses rope drive as a first-stage platform and uses the hanging basket as a second-stage platform, which is low in mechanism inertia and large work space, can realize spatial location in a large range, and can be applied to grinding, cleaning and spraying of various types, particularly large, equipment and components.

2. The grinding mechanism and the cleaning and spraying mechanism of the present disclosure are integrated, which greatly simplifies a mechanical structure and a work flow process.

3. Magnetorheological dampers are mounted between the hanging basket of the present disclosure and the top surface of a wall, which can effectively improve the rigidity and the stability of the mechanism. The first ropes and the hanging basket of the present disclosure are connected with through the single-ended magnetorheological dampers, which can inhibit vibration, and can also realize accurate location of the hanging basket. The double-ended magnetorheological dampers between the partition plate of the hanging basket and the vertical posts of the present disclosure can effectively prevent the vibration in a movement process of the hanging process and ensure the spraying quality.

4. The cleaning and spraying mechanism of the present disclosure uses flexible ropes instead of a traction element serving as a parallel mechanism, which has the characteristics of high bearing capacity and high accuracy of a rigid parallel structure, and also has the characteristics of light weight, portability, and flexibility of soft ropes.

5. The spring reaction force regulation mechanism of the present disclosure monitors the stress condition of the cleaning and spraying mechanism through the force sensor in real time, which regulates quickly and ensures balanced stress of the mechanisms, thereby ensuring the spraying quality.

6. Front-back movement of the grinding mechanism of the present disclosure is realized through the lifting scissors mechanism, and meanwhile, left-right movement of the second fixed table can be realized on the hanging basket, which improves the grinding flexibility and quality, and makes the grinding, cleaning, and spraying operations do not interfere with one another, thereby ensuring the work efficiency and the reliability.

7. Various rope winding mechanisms of the present disclosure use novel devices, and the contact points between the ropes and the drum is kept at the same points all the time, which can effectively reduce the oscillation and friction phenomena generated by the ropes during a winding process, and can also improve the accuracy and the stability of the movement output under the control of the ropes.

8. The cleaning liquid barrel and the paint barrel of the present disclosure are stored on the bottom plate of the hanging basket, so the structure is more compact.

The above-mentioned embodiments are merely description of the preferred embodiments of the present disclosure, and do not limit the scope of the present disclosure. Various modifications and improvements made to the technical scheme of the present disclosure by those of ordinary skill in the art without departing from the design spirit of the present disclosure shall fall within the protection scope determined by the claims of the present disclosure.

What is claimed is:

1. A rope traction type grinding, cleaning, and coating integrated operation robot, comprising:
a hanging basket (1) of a frame structure;
a first traction mechanism connected to the hanging basket (1);
a grinding mechanism (3) arranged in front of the hanging basket (1); and
a cleaning and spraying mechanism (4) and a spring reaction force regulation mechanism (5) arranged in the hanging basket (1);
wherein the first traction mechanism comprises first ropes (22) for connecting the hanging basket (1) and first rope winding mechanisms (21), the first rope winding mechanisms are configured for winding and unwinding the first ropes (22) respectively so as to regulate a movement of the hanging basket (1) of three degrees of freedom in space; the cleaning and spraying mechanism (4) comprises a first vertical plate (41) and a second vertical plate (42) that are vertically arranged in parallel; a cleaning nozzle (43) and a spraying nozzle (44) are mounted on the first vertical plate (41); the spring reaction force regulation mechanism (5) comprises a third vertical plate (51) that is parallel to the second vertical plate (42); the second vertical plate (42) is located between the first vertical plate (41) and the third vertical plate (51), and able to move in a front-back direction of the hanging basket (1); the third vertical plate (51) is fixedly connected to the hanging basket (1); a telescopic rod (45) and a second traction mechanism are arranged between and connected to the first vertical plate (41) and the second vertical plate (42); the telescopic rod (45) is configured to be expanded and contracted to make the first vertical plate (41) move back and forth relative to the hanging basket (1); the second traction mechanism controls the first vertical plate (41) to realize an adjustment of a pitch angle; a rigid rod (52) and a third traction mechanism are arranged between and connected to the third vertical plate (51) and the second vertical plate (42); one end of the rigid rod (52) is fixedly connected to the second vertical plate (42); an other end of the rigid rod (52) is connected to springs (54) arranged on the third vertical plate (51) after penetrating through the third vertical plate (51) vertically; a thrust force applied on the cleaning and spraying mechanism (4) by the rigid rod (52) and a reaction force applied on the cleaning and spraying mechanism (4) due to cleaning and spraying are balanced by changes of lengths of the springs (54) and changes of included angles between the springs (54) and the rigid rod (52); the grinding mechanism (3) comprises a grinding head (31) and a telescopic mechanism for connecting the grinding head (31) and the hanging basket (1); the telescopic rod (45) is connected to centers of the first vertical plate (41) and the second vertical plate (42); one end of the telescopic rod (45) is connected to a connecting pin (411) arranged on the first vertical plate (41) through a second universal joint (412); an other end of the telescopic rod (45) is fixedly connected to the second vertical plate (42).

2. The rope traction type grinding, cleaning, and coating integrated operation robot according to claim 1, wherein one end of each of the first ropes (22) is connected to a corresponding one of the first rope winding mechanisms (21) fixed to the ground; an other end of each first rope (22) is connected to a corresponding one of single-ended magnetorheological dampers (11) arranged at a top of the hanging basket (1) after surrounding through a corresponding one of first pulley blocks (23) fixed to a top surface of a wall; an other end of each of the single-ended magnetorheological dampers (11) is connected to the top of the hanging basket (1) through a pin shaft; each of the first rope winding mechanisms (21) is driven to rotate by a corresponding one of first driving motors (24) to realize the winding and unwinding of the first rope (22); a number of the first ropes (22), a number of the first rope winding mechanisms (21), a number of the first driving motors (24), a number of the first pulley blocks (23), and a number of the single-ended magnetorheological dampers (11) are all four; the four single-ended magnetorheological dampers (11) are located at four corners of the top of the hanging basket (1) respectively.

3. The rope traction type grinding, cleaning, and coating integrated operation robot according to claim 1, wherein each of the first rope winding mechanisms (21) comprises a drum (211) configured for winding a corresponding one of the first ropes (22), and a left end cover (212) and a right end cover (213) respectively arranged on two sides of the drum (211); a first boss (2121) and a second boss (2131) are respectively arranged at centers of end surfaces, close to each other, of the left end cover (212) and a right end cover (213); the first boss (2121) and the second boss (2131) are respectively in rotating fit with the left end cover (212) and the right end cover (213); a roller shaft (214) is fixedly connected to and arranged at centers of the first boss (2121) and the second boss (2131); the drum (211) is arranged on the roller shaft (214) in a sleeving manner, and the drum (211) is in threaded connection with the roller shaft (214); rotating shafts (215) which penetrate through the drum (211) are uniformly distributed in a circumferential direction of the roller shaft (214); two ends of the rotating shaft (215) are respectively fixedly connected to the left end cover (212) and the right end cover (213); a threaded section matched with the drum (211) is arranged on the roller shaft (214); a threaded hole matched with the threaded section is formed in the drum (211); the rotating shaft (215) is a polished shaft; a polished hole which is in transition fit with the rotating shaft (215) is formed in the drum (211).

4. The rope traction type grinding, cleaning, and coating integrated operation robot according to claim 2, wherein each of the first rope winding mechanisms (21) comprises a drum (211) configured for winding a corresponding one of the first ropes (22), and a left end cover (212) and a right end cover (213) respectively arranged on two sides of the drum (211); a first boss (2121) and a second boss (2131) are respectively arranged at centers of end surfaces, close to each other, of the left end cover (212) and a right end cover (213); the first boss (2121) and the second boss (2131) are respectively in rotating fit with the left end cover (212) and the right end cover (213); a roller shaft (214) is fixedly connected to and arranged at centers of the first boss (2121) and the second boss (2131); the drum (211) is arranged on the roller shaft (214) in a sleeving manner, and the drum (211) is in threaded connection with the roller shaft (214); rotating shafts (215) which penetrate through the drum (211) are uniformly distributed in a circumferential direction of the roller shaft (214); two ends of the rotating shaft (215) are respectively fixedly connected to the left end cover (212) and the right end cover (213); a threaded section matched with the drum (211) is arranged on the roller shaft (214); a threaded hole matched with the threaded section is formed in the drum (211); the rotating shaft (215) is a polished shaft; a polished hole which is in transition fit with the rotating shaft (215) is formed in the drum (211).

5. The rope traction type grinding, cleaning, and coating integrated operation robot according to claim 1, wherein the telescopic mechanism comprises a first fixed table (32) and a second fixed table (33) that are vertically arranged in parallel; a lifting scissors mechanism (34) is arranged between and connected to the first fixed table (32) and the second fixed table (33); the lifting scissors mechanism (34) is driven by a hydraulic cylinder (35); the grinding head (31) is connected to an outer side surface of the first fixed table (32) through a spherical hinge (36); the second fixed table (33) is matched with and fixed to horizontal sliding rails (161) arranged on a mounting plate of the hanging basket; the second fixed table (33) is able to move left and right in a direction limited by the horizontal sliding rails (161).

6. The rope traction type grinding, cleaning, and coating integrated operation robot according to claim 1, wherein the second traction mechanism comprises three second ropes (461), three second pulley blocks (462) fixed to the first vertical plate (41), and three second rope winding mechanisms (463) and three third rope winding mechanisms (464) fixed to the second vertical plate (42); one end of each of the second ropes (461) is connected to a corresponding one of the second rope winding mechanisms (463); an other end of each of the second ropes (461) is connected to a corresponding one of the third rope winding mechanisms (464) after surrounding the second pulley blocks (462); the second rope winding mechanism (463) and the third rope winding mechanism (464) are driven by a corresponding one of three second driving mechanisms (465); the second rope winding mechanisms (463), the third rope winding mechanisms (464), and the second driving mechanisms (465) are all fixed to an upper steller hinge (466); a lower steller hinge (467) matched with the upper steller hinge (466) is fixed to the second vertical plate (42); a first universal joint (468) is arranged between and connected to the upper steller hinge (466) and the lower steller hinge (467).

7. The rope traction type grinding, cleaning, and coating integrated operation robot according to claim 1, wherein both the cleaning nozzle (43) and the spraying nozzle (44) are fixed to an S-shaped nozzle gripper (47); a rotary shaft (471) in rotating fit with an outer plate surface of the first vertical plate (41) is arranged at a center of the S-shaped nozzle gripper (47); under a driving of a motor, the rotary shaft (471) completes a rotation of 0 to 180 degrees to switch the cleaning nozzle (43) and the spraying nozzle (44); the cleaning nozzle (43) and the spraying nozzle (44) are located at a central position of the second vertical plate (42) in a working state; the cleaning nozzle (43) and the spraying nozzle (44) are connected to a cleaning liquid barrel (431) and a paint barrel (441) respectively, wherein the cleaning liquid barrel (431) and the paint barrel (441) respectively, wherein the cleaning liquid barrel (431) and the paint barrel (441) are arranged at a bottom plate of the hanging basket through connecting pipes (48).

8. The rope traction type grinding, cleaning, and coating integrated operation robot according to claim 1, wherein a rigid rod hole (55) matched with the rigid rod (52) is formed in the center of the third vertical plate (51); the rigid rod (52) is connected to the rigid rod hole (55) through a prismatic joint, and the rigid rod (52) is able to move in the axial direction of the third vertical plate (51); four through grooves (56) which are perpendicular to the rigid rod (52) are uniformly distributed in the circumferential direction of the rigid hole (55); a central shaft (561) is arranged in a center of and in a length direction of a corresponding one of the through grooves (56); a mass block (562) is arranged on the central shaft (561) in a sleeving manner; the mass block (562) is in sliding fit with moving guide rails (563) arranged on groove walls on two sides of the corresponding one of the through grooves (56); an extension spring (564) is arranged at one end, away from the rigid rod hole (55), of the central shaft (561) in a sleeving manner; one end of the extension spring (564) is fixed to the mass block (562); an other end of the extension spring (564) is fixed to a groove wall on an end of the corresponding one of the through grooves (56); an end surface, at a proximal end of the second vertical plate (42), of the mass block (562) is connected to the third traction mechanism; an end surface, away from the second vertical plate (42), of the mass block (562) is connected to the spring (54) through a spring fixing terminal; an other end of the spring (54) is connected to an end part of the rigid rod (52) through a spring knot (57).

9. The rope traction type grinding, cleaning, and coating integrated operation robot according to claim 1, wherein the third traction mechanism comprises four third ropes (531), and four third pulley blocks (532) and four fourth rope winding mechanisms (533) fixed to the second vertical plate (42); one end of each of the third ropes (531) is connected to the mass block (562); an other end of each of the third ropes (531) is connected to a corresponding one of the fourth rope winding mechanisms (533) after surrounding through a corresponding one of the third pulley blocks (532); each of the fourth rope winding mechanisms (533) is driven by a corresponding one of four third driving motor (534).

10. The rope traction type grinding, cleaning, and coating integrated operation robot according to claim 1, wherein the hanging basket (1) is of an one-piece structure, and comprises a top plate (12) and a bottom plate (13) that are arranged in parallel, and four vertical posts (14) for connecting the top plate (12) and the bottom plate (13); a partition plate (15) which is arranged horizontally is arranged between the top plate (12) and the bottom plate (13); a mounting plate (16) which is perpendicular to the partition plate (15) and is fixed to the vertical posts at a front end of the hanging basket (1) is arranged at a front end of the partition plate (15); the cleaning and spraying mechanism (4) and the spring reaction force regulation mechanism (5) are mounted between the top plate (12) and the partition plate (15); the grinding mechanism (3) is fixed to an outer plate surface of the mounting plate (16); guide rails (17) are symmetrically arranged on a lower plate surface of the top plate (12) and an upper plate surface of the partition plate (15) respectively; arrangement directions of the guide rails (17) coincide with the front-back direction of the hanging basket (1); a baffle plate (18) is arranged at front ends of the guide rails (17); the third vertical plate (51) is arranged at rear ends of the guide rails (17); rollers (421) in rolling fit with the guide rails (17) are respectively arranged on an upper end surface and a lower end surface of the second vertical plate (42); an upper end surface and a lower end surface of the third vertical plate (51) are respectively and fixedly connected to the top plate (12) and the partition plate (15).

11. The rope traction type grinding, cleaning, and coating integrated operation robot according to claim 10, wherein three magnetorheological dampers (19) are further arranged between and connected to the hanging basket (1) and the top surface of the wall each of four double-ended magnetorheological dampers (20) are arranged between and connected to a bottom surface of the partition plate and a corresponding one of the vertical posts one end of each of the double-ended magnetorheological dampers (20) is hinged to an upper connecting pin seat (201) arranged on the partition plate (15); an other end of each of the double-ended magnetorheological dampers (20) is hinged to a lower connecting pin seat (202) arranged on the corresponding one of the vertical posts (14).

* * * * *